US010917235B2

(12) United States Patent
Gama et al.

(10) Patent No.: US 10,917,235 B2
(45) Date of Patent: Feb. 9, 2021

(54) HIGH-PRECISION PRIVACY-PRESERVING REAL-VALUED FUNCTION EVALUATION

(71) Applicant: Inpher, Inc., New York, NY (US)

(72) Inventors: Nicolas Gama, Lausanne (CH); Jordan Brandt, Holton, KS (US); Dimitar Jetchev, St-Saphorin-Lavaux (CH); Stanislav Peceny, New York, NY (US); Alexander Petric, New York, NY (US)

( * ) Notice: Subject to any disclaimer, the term of this patent is extended or adjusted under 35 U.S.C. 154(b) by 0 days.

(21) Appl. No.: 16/937,310

(22) Filed: Jul. 23, 2020

(65) Prior Publication Data

US 2020/0358601 A1 Nov. 12, 2020

Related U.S. Application Data

(63) Continuation of application No. 16/643,833, filed as application No. PCT/US2018/048963 on Aug. 30, 2018.

(Continued)

(51) Int. Cl.
*H04L 9/08* (2006.01)
*G06F 17/14* (2006.01)
(Continued)

(52) U.S. Cl.
CPC ............ *H04L 9/085* (2013.01); *G06F 17/147* (2013.01); *G06F 17/16* (2013.01); *G06N 3/0481* (2013.01);
(Continued)

(58) Field of Classification Search
CPC . H04L 9/085; H04L 2209/04; H04L 2209/46; G06F 17/147; G06F 17/16; G06N 3/0481; G06N 3/08; G06N 20/00
(Continued)

(56) References Cited

U.S. PATENT DOCUMENTS 9,077,539 B2* 7/2015 Kamara ................ H04L 9/3218
9,450,938 B1* 9/2016 Lampkins ............. H04L 67/10
(Continued)

FOREIGN PATENT DOCUMENTS

WO 2019046651 A2 3/2019

OTHER PUBLICATIONS

"Arcene Data Set", URL: https://archive.ics.uci.edu/ml/datasets/Arcene, UCI Machine Learning Repository, retrieved on Aug. 29, 2017, Aug. 29, 2017, 3 pages.
(Continued)

*Primary Examiner* — Shahriar Zarrineh
(74) *Attorney, Agent, or Firm* — Patent GC LLC; Alexander Franco

(57) ABSTRACT

A method for performing privacy-preserving or secure multi-party computations enables multiple parties to collaborate to produce a shared result while preserving the privacy of input data contributed by individual parties. The method can produce a result with a specified high degree of precision or accuracy in relation to an exactly accurate plaintext (non-privacy-preserving) computation of the result, without unduly burdensome amounts of inter-party communication. The multi-party computations can include a Fourier series approximation of a continuous function or an approximation of a continuous function using trigonometric polynomials, for example, in training a machine learning classifier using secret shared input data. The multi-party computations can include a secret share reduction that transforms an instance of computed secret shared data stored in floating-point representation into an equivalent, equivalently precise, and equivalently secure instance of computed secret shared data having a reduced memory storage requirement.

27 Claims, 9 Drawing Sheets

Related U.S. Application Data

(60) Provisional application No. 62/647,635, filed on Mar. 24, 2018, provisional application No. 62/641,256, filed on Mar. 9, 2018, provisional application No. 62/560,175, filed on Sep. 18, 2017, provisional application No. 62/552,161, filed on Aug. 30, 2017.

(51) Int. Cl.
*G06F 17/16* (2006.01)
*G06N 3/04* (2006.01)
*G06N 3/08* (2006.01)

(52) U.S. Cl.
CPC ............ *G06N 3/08* (2013.01); *H04L 2209/04* (2013.01); *H04L 2209/46* (2013.01)

(58) Field of Classification Search
USPC .......................................................... 713/164
See application file for complete search history.

(56) References Cited

U.S. PATENT DOCUMENTS

| | | | |
|---|---|---|---|
| 9,813,234 B2* | 11/2017 | Clark | H04L 9/085 |
| 10,083,310 B1* | 9/2018 | Lampkins | G06F 21/606 |
| 10,360,390 B2* | 7/2019 | Tueno | G06F 21/602 |
| 10,396,984 B2* | 8/2019 | French | G06Q 20/4012 |
| 10,547,592 B2* | 1/2020 | Bellala | H04L 63/0421 |
| 10,565,524 B2* | 2/2020 | Bellala | G06F 21/602 |
| 10,664,604 B2* | 5/2020 | Lindell | G06F 21/6227 |
| 2011/0295918 A1* | 12/2011 | Prouff | G06F 7/724 708/250 |
| 2013/0275752 A1* | 10/2013 | Zhang | H04L 9/008 713/167 |
| 2014/0075183 A1* | 3/2014 | Wang | G16B 30/00 713/150 |
| 2015/0074159 A1* | 3/2015 | Poschmann | G09C 1/00 708/270 |
| 2016/0004874 A1* | 1/2016 | Ioannidis | G06F 17/16 713/165 |
| 2017/0250816 A1* | 8/2017 | Popa | G06F 21/12 |
| 2018/0011996 A1* | 1/2018 | Dolev | H04L 9/085 |
| 2018/0366036 A1* | 12/2018 | Furukawa | H04L 9/0869 |
| 2018/0373834 A1 | 12/2018 | Cho et al. | |
| 2019/0116180 A1* | 4/2019 | Teranishi | H04L 9/3221 |
| 2019/0190705 A1* | 6/2019 | Dolev | G06F 21/577 |
| 2019/0212986 A1* | 7/2019 | Araki | G06F 7/4824 |
| 2019/0333415 A1* | 10/2019 | Hamada | H04L 9/0631 |
| 2020/0151356 A1* | 5/2020 | Rohloff | G06F 21/6227 |
| 2020/0242466 A1* | 7/2020 | Mohassel | H04L 9/008 |

OTHER PUBLICATIONS

"International Preliminary Report of Patentability", Received for Application No. PCT/US2018/048963 dated Nov. 18, 2019, 19 pages.
"International Search Report and Written Opinion", Received for PCT Application No. PCT/US2020/019551 dated May 29, 2020, 13 pages.
"International Search Report and Written Opinion", Received for PCT Application No. PCT/US2018/048963 dated Feb. 15, 2019, 15 pages.
Abadi, et al., "Deep Learning with Differential Privacy", Proceedings of the 2016 ACM SIGSAC Conference on Computer and Communications Security, Oct. 24-28, 2016, 14 pages.
Aly, et al., "Benchmarking Privacy Preserving Scientific Operations", Applied Cryptography and Network Security—17th International Conference, Proceedings, vol. 11464 of Lecture Notes in Computer Science, Springer, Jun. 5-7, 2019, pp. 509-529.
Aono, et al., "Privacy-Preserving Logistic Regression with Distributed Data Sources via Homomorphic Encryption", IEICE Transactions, Information and Systems, vol. 99-D, No. 8, Aug. 2016, pp. 2079-2089.
Aono, et al., "Scalable and Secure Logistic Regression via Homomorphic Encryption", Proceedings of the Sixth ACM Conference on Data and Application Security and Privacy, Mar. 9-11, 2016, pp. 1-23.
Araki, et al., "High-Throughput Semi-Honest Secure Three-Party Computation with an Honest Majority", Proceedings of the ACM SIGSAC Conference on Computer and Communications Security, Oct. 24-28, 2016,, 13 pages.
Asharov, et al., "More Efficient Oblivious Transfer and Extensions for Faster Secure Computation", Proceedings of the 2013 ACM SIGSAC conference on Computer & communications security, Nov. 4-8, 2013, pp. 535-547.
Bachrach, et al., "CryptoNets: Applying Neural Networks to Encrypted Data with High Throughput and Accuracy", Proceedings of the 33nd International Conference on Machine Learning, Jun. 19-24, 2016, 10 pages.
Bayatbabolghani, et al., "Secure Fingerprint Alignment and Matching Protocols", Feb. 10, 2017, pp. 1-37.
Beaver, "Efficient Multiparty Protocols Using Circuit Randomization", Annual International Cryptology Conference, CRYPTO 1991: Advances in Cryptology, LNCS, vol. 576, Springer, 1992, pp. 420-432.
Bellare, et al., "Efficient Garbling from a Fixed-Key Blockcipher", IEEE Symposium on Security and Privacy, May 19-22, 2013, pp. 478-492.
Bjorck, "Numerical Methods for Least Squares Problems", Society for Industrial and Applied Mathematics, 1996, 14 pages.
Bogdanov, et al., "Sharemind: A Framework for Fast Privacy-Preserving Computations", ESORICS, LNCS, Springer, vol. 5283, 2008, pp. 192-206.
Boura, et al., "High-Precision Privacy-Preserving Real-Valued Function Evaluation", URL: https://eprint.iacr.org/2017 /1234, Cryptology ePrint Archive, 2017, pp. 1-26.
Boyd, "A Comparison of Numerical Algorithms for Fourier Extension of the First, Second, and Third Kinds", Journal of Computational Physics, vol. 178, No. 1, May 2002, pp. 118-160.
Boyd, "Asymptotic Fourier Coefficients for a $C\infty$ Bell (Smoothed—"Top-Hat") & the Fourier Extension Problem", Journal of Scientific Computing, vol. 29, No. 1, Oct. 2006, pp. 1-24.
Boyd, "Fourier embedded domain methods: extending a function defined on an irregular region to a rectangle so that the extension is spatially periodic and $c\infty$", ScienceDirect, Applied Mathematics and Computation, vol. 161, No. 2, Feb. 2005, pp. 591-597.
Catrina, et al., "Secure Computation with Fixed-Point Numbers", Financial Cryptography and Data Security—14th International Conference, vol. 6052 of Lecture Notes in Computer Science, Springer, Jan. 25-28, 2010, pp. 35-50.
Chaudhuri, et al., "Privacy-preserving logistic regression", Proceedings of the Twenty-Second Annual Conference on Neural Information Processing Systems, Advances in Neural Information Processing Systems, vol. 21, Dec. 8-11, 2008, pp. 1-8.
Cho, et al., "Secure genome-wide association analysis using multiparty computation", Nature Biotechnology, Letters, May 7, 2018, 7 pages.
Cramer, et al., "Secure Multiparty Computation and Secret Sharing", Cambridge University Press, 2015, 413 pages.
Damgard, et al., "Multiparty Computation from Somewhat Homomorphic Encryption", Advances in Cryptology—CRYPTO 2012, 32nd Annual Cryptology Conference, Proceedings, vol. 7417 of Lecture Notes in Computer Science, Aug. 19-23, 2012, pp. 1-46.
Damgard, et al., "SPDZ Software", URL: https://www.cs.bris.ac.uk/Research/CryptographySecurity/SPDZ/, retrieved on Aug. 29, 2017, Aug. 29, 2017, pp. 1-9.
Demmler, et al., "ABY—A Framework for Efficient Mixed-Protocol Secure Two-Party Computation", 22nd Annual Network and Distributed System Security Symposium, Feb. 8-11, 2015, pp. 1-15.
Fefferman, "Interpolation and extrapolation of smooth functions by linear operators", Rev. Mat. Iberoamericana, vol. 21, No. 1, 2005, pp. 313-348.
Gascon, et al., "Privacy-Preserving Distributed Linear Regression on High-Dimensional Data", Proceedings on Privacy Enhancing Technologies, vol. 4, 2017, pp. 248-267.

(56) References Cited

OTHER PUBLICATIONS

Ghodosi, et al., "Multi-party computation with conversion of secret sharing", Des. Codes Cryptogr, vol. 62, Springer, 2012, pp. 259-272.

Goodfellow, et al., "Deep Learning", URL: http://www.deeplearningbook.org, MIT Press, 2016, 10 pages.

Hiemenway, et al., "High-precision Secure Computation of Satellite Collision Probabilities", International Conference on Security and Cryptography for Networks, Security and Cryptography for Networks, LNCS, vol. 9841, Springer, 2016, pp. 1-25.

Hestenes, "Extension of the Range of a Differentiable Function", Duke Math. J., vol. 8, 1941, pp. 183-192.

Huybrechs, "On the Fourier Extension of Nonperiodic Functions", SIAM J. Numerical Analysis, vol. 47, No. 6, 2010, pp. 4326-4355.

Jaschke, et al., "Accelerating Homomorphic Computations on Rational Numbers", Applied Cryptography and Network Security: 14th International Conference, Proceedings, vol. 9696 of LNCS, Springer, Jun. 19-22, 2016, pp. 405-423.

Keller, et al., "MASCOT: Faster Malicious Arithmetic Secure Computation with Oblivious Transfer", Proceedings of the 2016 ACM SIGSAC Conference on Computer and Communications Security, vol. 505, Oct. 2016, pp. 1-39.

Kolesnikov, et al., "A systematic approach to practically efficient general two-party secure function evaluation protocols and their modular design", Journal of Computer Security, vol. 21, No. 2, 2013, pp. 283-315.

Kolesnikov, et al., "FleXOR: Flexible garbling for XOR gates that beats free-XOR", 34th Annual Cryptology Conference, Advances in Cryptology—CRYPTO, Proceedings, Part II, vol. 8617 of Lecture Notes in Computer Science, Springer, Aug. 17-21, 2014, pp. 1-24.

Kolesnikov, et al., "Improved Garbled Circuit: Free XOR Gates and Applications", 35th International Colloquium on Automata, Languages, and Programming, LNCS, vol. 5126, Springer, Jul. 7-11, 2008, pp. 1-12.

Krips, et al., "Hybrid Model of Fixed and Floating Point Numbers in Secure Multiparty Computations", 12th European Conference on Computer Vision, Jan. 1, 2014, Dec. 23, 2014, pp. 179-197.

Lecun, et al., "The MNIST Database of Handwitten Digits", URL: http://yann.lecun.com/exdb/mnist/, retrieved on Aug. 29, 2017, Aug. 29, 2017, pp. 1-8.

Lindell, et al., "Privacy Preserving Data Mining", 20th Annual International Cryptology Conference, Advances in Cryptology, Proceedings, Aug. 20-24, 2000, 26 pages.

Livni, et al., "On the Computational Efficiency of Training Neural Networks", Annual Conference on Neural Information Processing Systems, Advances in Neural Information Processing Systems, vol. 27, Dec. 8-13, 2014, pp. 1-15.

Malkhi, et al., "Fairplay—A Secure Two-Party Computation System", Proceedings of the 13th USENIX SeC'urity Symposium, Aug. 9-13, 2004, 17 pages.

Mohassel, et al., "ABY3: A Mixed Protocol Framework for Machine Learning", Proceedings of the 2018 ACM SIGSAC Conference on Computer and Communications Security, Oct. 15-19, 2018, pp. 35-52.

Mohassel, et al., "SecureML: A System for Scalable Privacy-Preserving Machine Learning", IEEE Symposium on Security and Privacy, May 1, 2017, pp. 19-38.

Naor, et al., "Privacy Preserving Auctions and Mechanism Design", Proceedings of the 1st ACM conference on Electronic commerce, Nov. 1999, 11 pages.

Nikolaenko, et al., "Privacy-Preserving Ridge Regression on Hundreds of Millions of Records", IEEE Symposium on Security and Privacy, May 19-22, 2013, 15 pages.

Phong, et al., "Privacy-Preserving Deep Learning: Revisited and Enhanced", Applications and Techniques in Information Security—8th International Conference, Proceedings, vol. 719 of Communications in Computer and Information Science, Jul. 6-7, 2017, pp. 100-110.

Schneider, et al., "Secure numerical and logical multi party operations", ScienceDirect, Journal of Information Security and Applications, vol. 34, May 13, 2017, pp. 207-217.

Shokri, et al., "Privacy-Preserving Deep Learning", Proceedings of the 22nd ACM SIGSAC Conference on Compute and Communications Security, Oct. 12-16, 2015, 12 pages.

Whitney, "Analytic Extensions of Differentiable Functions Defined in Closed Sets", Trans. Amer. Math. Soc., vol. 36, No. 1, 1934, pp. 63-89.

Wu, et al., "Privacy-preservation for Stochastic Gradient Descent Application to Secure Logistic Regression", The 27th Annual Conference of the Japanese Society for Artificial Intelligence, vol. 27, 2013, pp. 1-4.

Zahur, et al., "Obliv-c: A Language for Extensible Data-Oblivious Computation", IACR Cryptology ePrint Archive, vol. 1153, 2015, pp. 1-20.

Zahur, et al., "Two Halves Make a Whole—Reducing Data Transfer in Garbled Circuits using Half Gates", 34th Annual International Conference on the Theory and Applications of Cryptographic Techniques, Advances in Cryptology—EUROCRYPT 2015, Proceedings, Part II, vol. 9057 of Lecture Notes in Computer Science, Springer, Apr. 26-30, 2015, 28 pages.

\* cited by examiner

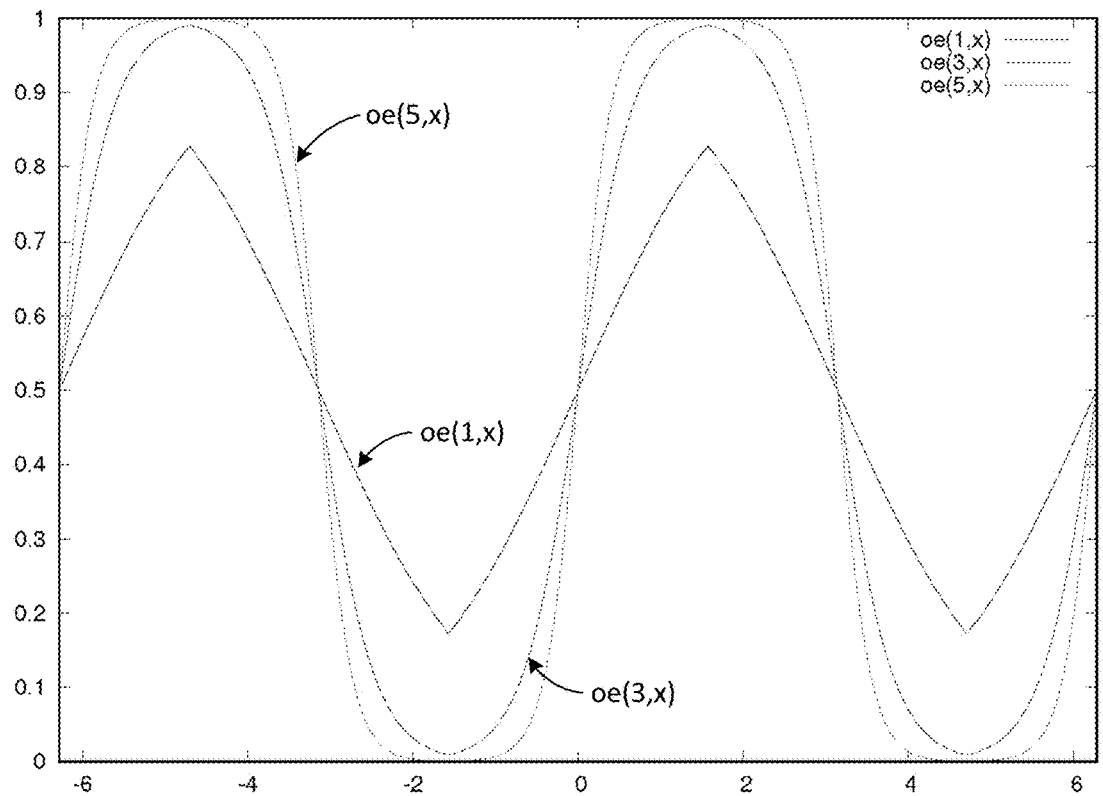
FIG. 1  Odd-even periodic extension of the rescaled sigmoid
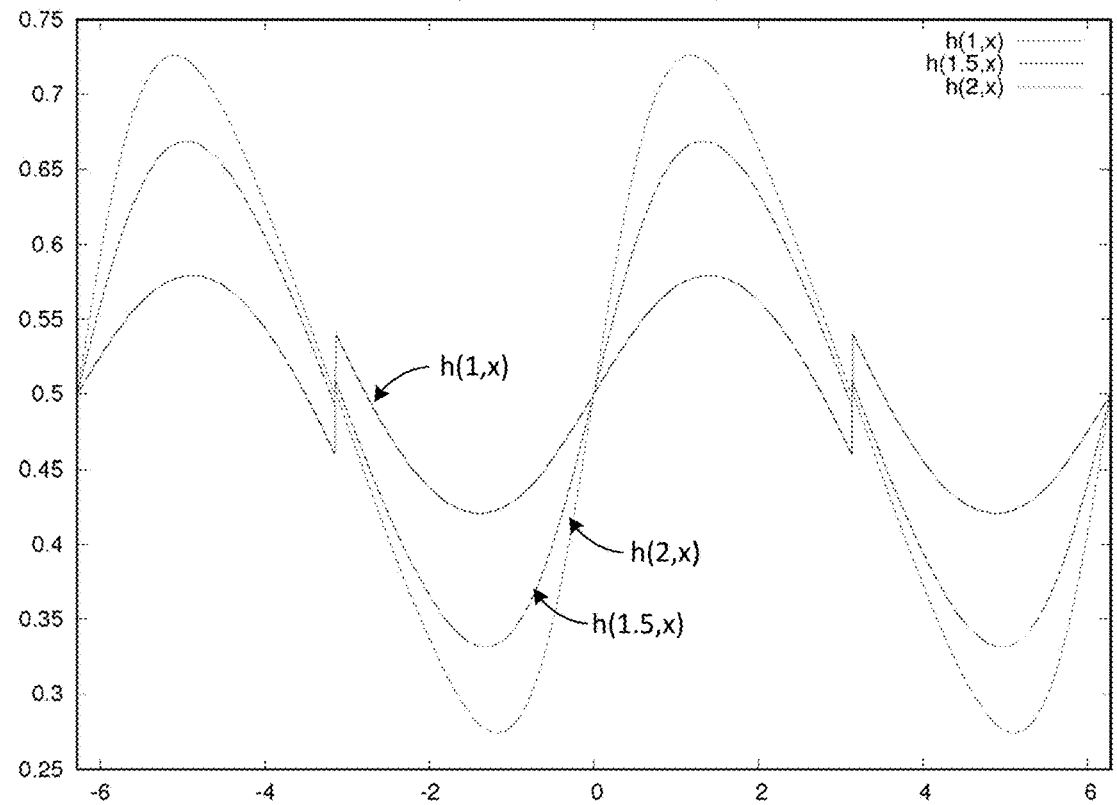
FIG. 2  Asymptotic approximation of the sigmoid via Theorem 1

FIG. 3 Communication channels in the offline phase
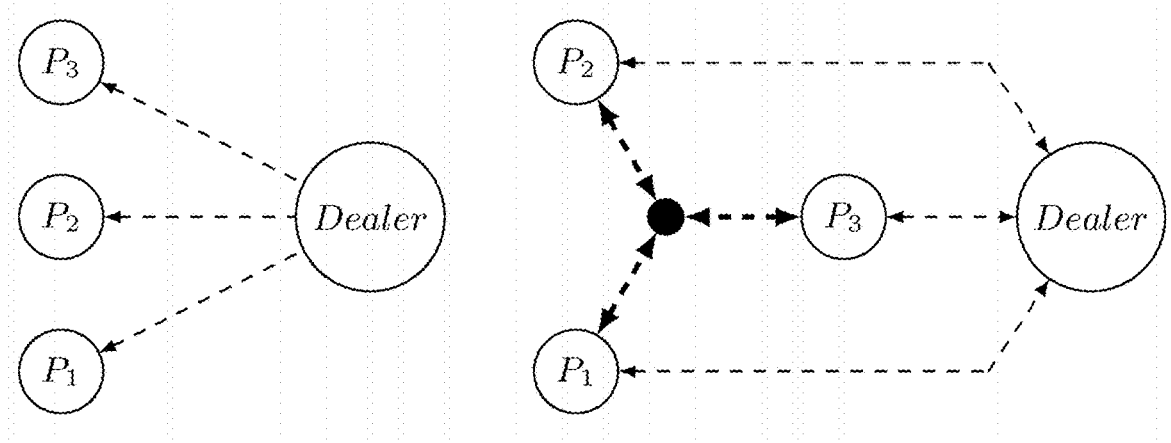
FIG. 4 Communication channels in the online phase
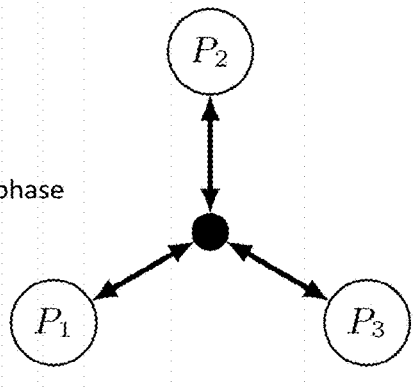
FIG. 5 Experimental results for n = 3 players
| Dataset size $N$ | # features $k$ | communication size (MB) | Precomputed data size (MB) | Time (sec) offline phase | Time (sec) online phase |
|---|---|---|---|---|---|
| 10000 | 8 | 13.75 | 50.55 | 20.07 | 6.51 |
| 10000 | 12 | 21.88 | 66.18 | 26.6 | 9.81 |
| 10000 | 20 | 45.97 | 113.1 | 46.26 | 19.83 |
| 25000 | 8 | 34.2 | 126.23 | 51.59 | 19.24 |
| 25000 | 12 | 54.52 | 165.14 | 68.14 | 24.7 |
| 25000 | 20 | 114.5 | 281.98 | 115.56 | 48.8 |
| 50000 | 8 | 68.53 | 252.35 | 103.41 | 32.89 |
| 50000 | 12 | 108.93 | 330.1 | 135.07 | 49.99 |
| 50000 | 20 | 228.7 | 563.46 | 229.17 | 103.3 |
| 100000 | 8 | 137 | 504.6 | 205.53 | 67.11 |
| 100000 | 12 | 217.75 | 659.96 | 269.04 | 99.99 |
| 100000 | 20 | 457.1 | 1126.41 | 457.33 | 205.28 |
| 150000 | 8 | 205.48 | 756.84 | 308.14 | 101.36 |
| 150000 | 12 | 326.56 | 989.83 | 343.86 | 152.41 |
| 150000 | 20 | 685.51 | 1689.36 | 685.74 | 314.4 |

FIG. 6 Evolution of the cost function depending on the method
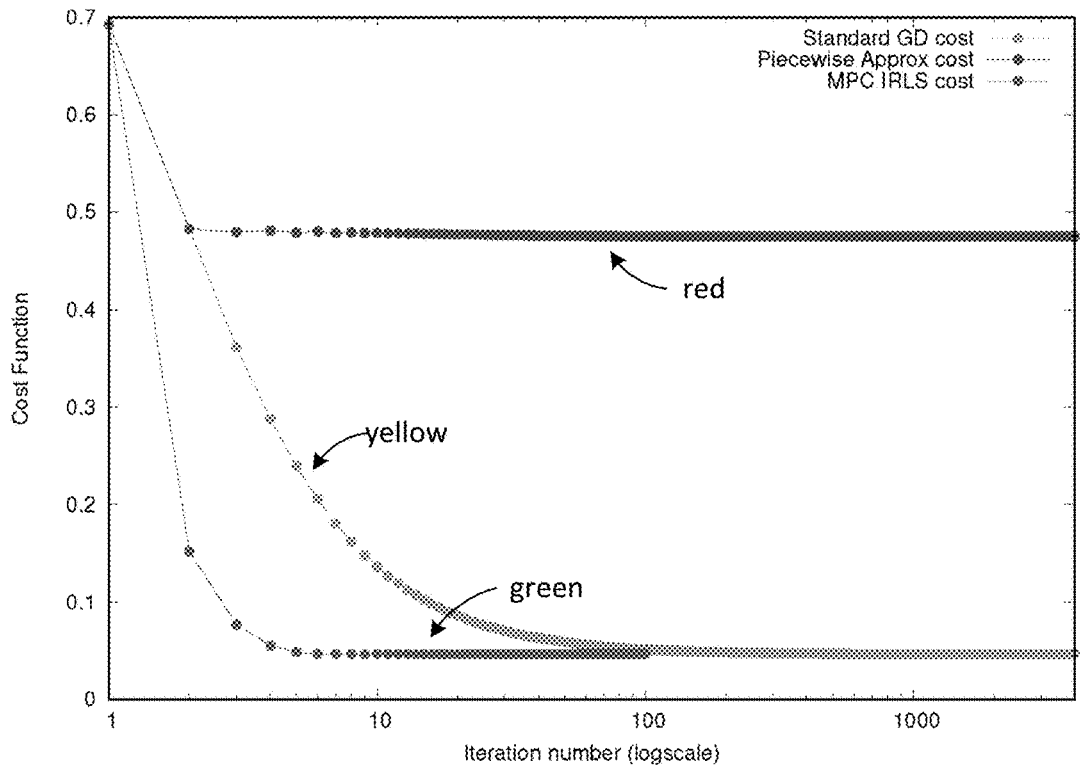
FIG. 7 Evolution of the F-score depending on the method
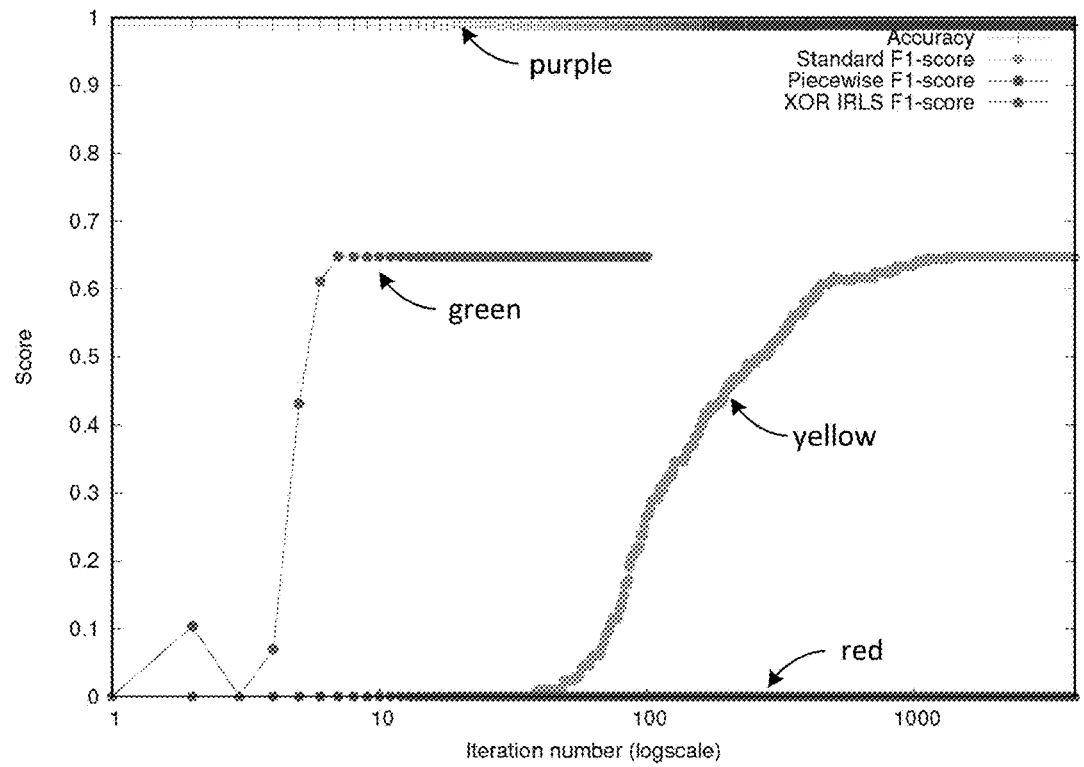

FIG. 8

The truth table of an AND gate

| $a$ | $b$ | $c$ |
|---|---|---|
| 0 | 0 | 0 |
| 0 | 1 | 0 |
| 1 | 0 | 0 |
| 1 | 1 | 1 |

The encrypted truth table

| |
|---|
| $\text{Enc}_{K_0^a K_0^b}(K_0^c)$ |
| $\text{Enc}_{K_0^a K_1^b}(K_0^c)$ |
| $\text{Enc}_{K_1^a K_0^b}(K_0^c)$ |
| $\text{Enc}_{K_1^a K_1^b}(K_1^c)$ |

FIG. 9

| Method | Secret gate | AND | XOR |
|---|---|---|---|
| Naive | (4,4,4) | (4,4,4) | (4,4,4) |
| Point-Perm | (4,4,1) | (4,4,1) | (4,4,1) |
| PP, RR | (4,3,1) | (4,3,1) | (4,3,1) |
| PP, RR, free-X | (4,3,1) | (4,3,1) | (0,0,0) |
| PP, RR, free-X, half-Gate | N.A. | (4,2,2) private (2,1,1) known plaintext | (0,0,0) |

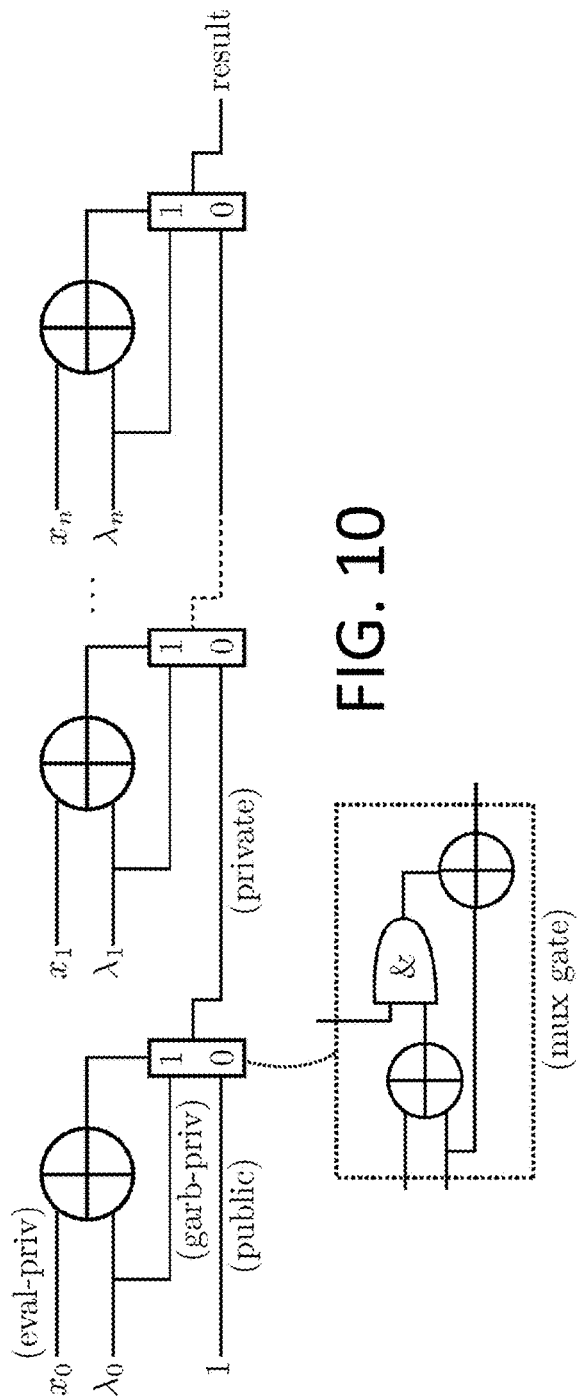
FIG. 10
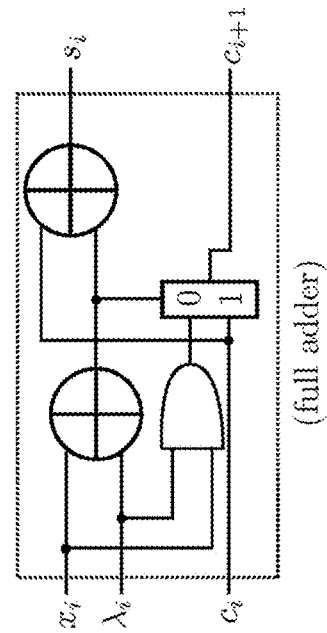
FIG. 11
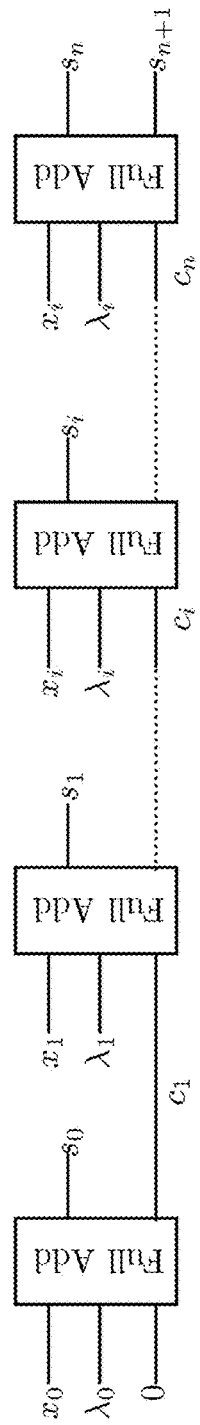

HIGH-PRECISION PRIVACY-PRESERVING REAL-VALUED FUNCTION EVALUATION

RELATED APPLICATIONS

The subject matter of this application is related to U.S. application Ser. No. 16/643,833, filed 2020 Mar. 10, Patent Cooperation Treaty Application No. US2018/048963, filed 2018 Aug. 30, U.S. Provisional Application No. 62/552,161, filed on 2017 Aug. 30, U.S. Provisional Application No. 62/560,175, filed on 2017 Sep. 18, U.S. Provisional Application No. 62/641,256, filed on 2018 Mar. 9, and U.S. Provisional Application No. 62/647,635, filed on 2018 Mar. 24, all of which applications are incorporated herein by reference in their entireties.

BACKGROUND OF THE INVENTION

There exist problems in privacy-preserving or secure multi-party computing that do not have effective solutions in the prior art. For example, suppose a number of organizations desire to collaborate in training a machine learning classifier in order to detect fraudulent activity, such as financial scams or phishing attacks. Each organization has a set of training data with examples of legitimate and fraudulent activity, but the individual organizations want to retain the privacy and secrecy of their data while still being able to collaboratively contribute their data to the training of the classifier. Such a training, in theory, can be accomplished using privacy-preserving or secure multi-party computing techniques. In order to be effective, however, the classifier must also support a very high level of precision to detect what may be relatively rare occurrences of fraudulent activity as compared to much more frequent legitimate activity. Existing secure multi-party computing techniques do not provide requisite levels of precision for such training without requiring unduly burdensome amounts of inter-party communication.

SUMMARY OF THE INVENTION

A method for performing privacy-preserving or secure multi-party computations enables multiple parties to collaborate to produce a shared result while preserving the privacy of input data contributed by individual parties. The method can produce a result with a specified high degree of precision or accuracy in relation to an exactly accurate plaintext (non-privacy-preserving) computation of the result, without unduly burdensome amounts of inter-party communication. The multi-party computations can include a Fourier series approximation of a continuous function or an approximation of a continuous function using trigonometric polynomials, for example, in training a machine learning classifier using secret shared input data. The multi-party computations can include a secret share reduction that transforms an instance of computed secret shared data stored in floating-point representation into an equivalent, equivalently precise, and equivalently secure instance of computed secret shared data having a reduced memory storage requirement.

As will be appreciated by one skilled in the art, multiple aspects described in the remainder of this summary can be variously combined in different operable embodiments. All such operable combinations, though they may not be explicitly set forth in the interest of efficiency, are specifically contemplated by this disclosure.

A method for performing secure multi-party computations can produce a result while preserving the privacy of input data contributed by individual parties.

In the method, a dealer computing system can create a plurality of sets of related numerical masking data components, wherein for each set of related numerical masking data components, each component of the set is one of: a scalar, a vector and a matrix. The dealer computing system can secret share, among a plurality of party computing systems, each component of each set of the plurality of sets of related numerical masking data components.

In the method, for each party computing system of the plurality of party computing systems, the party computing system can receive a respective secret share of each component of each set of the plurality of sets of numerical masking data components from the trusted dealer. The party computing system can, for at least one set of input data, receive a secret share of the set of input data. The party computing system can execute a set of program instructions that cause the party computing system to perform, in conjunction and communication with others of the party computing systems, one or more multi-party computations to create one or more instances of computed secret shared data. For each instance, the party computing system can compute a secret share of the instance based on at least one secret share of a set of input data or at least one secret share of another instance of computed secret shared data. Received secret shares of numerical masking data components can be used to mask data communicated during the computations.

The computations can include, for example, a Fourier series approximation of a continuous function or an approximation of a continuous function using trigonometric polynomials. The computations can also or alternatively include, for example, a secret share reduction that transforms an instance of computed secret shared data stored in floating-point representation into an equivalent, equivalently precise, and equivalently secure instance of computed secret shared data having a reduced memory storage requirement.

In the method, the party computing system can transmit a secret share of an instance of computed secret shared data to one or more others of the plurality of party computing systems. For at least one party computing system, the party computing system can receive one or more secret shares of an instance of computed secret shared data from one or more others of the plurality of party computing systems. The party computing system can combine the received secret shares of the instance of computed secret shared data to produce the result.

The method can be performed such that the computations further include partitioning a domain of a function into a plurality of subintervals; and for each subinterval of the plurality of subintervals: determining an approximation of the function on the subinterval, and computing an instance of computed secret shared data using at least one of garbled circuits and oblivious selection.

The approximation of the continuous function can be on an interval. The approximation can be a uniform approximation of the continuous function. The continuous function can be a machine learning activation function. The machine learning activation function can be the sigmoid function. The machine learning activation function can be the hyperbolic tangent function. The machine learning activation function can be a rectifier activation function for a neural network. The continuous function can be the sigmoid function.

The secret share reduction can include masking one or more most significant bits of each secret share of an instance of computed secret shared data. The result can be a set of coefficients of a logistic regression classification model. The method can implement a logistic regression classifier, and the result can be a prediction of the logistic regression classifier based on the input data.

The dealer computing system can be a trusted dealer computing system, and communications between the party computing systems can be made inaccessible to the trusted dealer computing system.

The dealer computing system can be an honest-but-curious dealer computing system, and privacy of secret shared input data contributed by one or more of the party computing systems can be preserved regardless of whether communications between the party computing systems can be accessed by the honest-but-curious dealer computing system.

The method can further include: for at least one set of input data, performing a statistical analysis on the set of input data to determine a set of input data statistics; performing a pre-execution of a set of source code instructions using the set of input data statistics to generate statistical type parameters for each of one or more variable types; and compiling the set of source code instructions based on the set of statistical type parameters to generate the set of program instructions. The pre-execution can be performed subsequent to: unrolling loops in the set of source code instructions having a determinable number of iterations; and unrolling function calls in the set of source code instructions.

The method can be performed such that at least one set of related numerical masking data components consists of three components having a relationship where one of the components is equal to a multiplicative product of a remaining two of the components.

The method can be performed such that at least one set of related numerical masking data components comprises a number and a set of one or more associated values of Fourier basis functions evaluated on the number.

The method can be performed such that the result has a predetermined degree of precision in relation to a plaintext computation of the result.

The method can be performed such that at least one of the plurality of party computing systems secret shares, among the plurality of party computing systems, a respective set of input data.

A system can include a plurality of computer systems, wherein the plurality of computer systems are configured to perform the method.

A non-transitory computer-readable medium can be encoded with the set of program instructions.

A non-transitory computer-readable medium can be encoded with computer code that, when executed by plurality of computer systems, cause the plurality of computer systems to perform the method.

BRIEF DESCRIPTION OF THE DRAWINGS

FIG. 1 illustrates a graph of the odd-even periodic extension of the rescaled sigmoid.

FIG. 2 illustrates an asymptotic approximation of the sigmoid via Theorem 1.

FIG. 3 illustrates a schematic of the connections during the offline phase of the MPC protocols in accordance with one embodiment.

FIG. 4 illustrates a schematic of the communication channels between players during the online phase in accordance with one embodiment.

FIG. 5 illustrates a table of results of our implementation summarizing the different measures we obtained during our experiments for n=3 players.

FIG. 6 shows the evolution of the cost function during the logistic regression as a function of the number of iterations.

FIG. 7 shows the evolution of the F-score during the same logistic regression as a function of the number of iterations.

FIG. 8 illustrates an example truth table and a corresponding encrypted truth table (encryption table).

FIG. 9 illustrates a table in which we give the garbling time, garbling size and the evaluation time for different garbling optimizations.

FIG. 10 illustrates an example comparison circuit.

FIG. 11 illustrates and example secret addition circuit.

DETAILED DESCRIPTION

Figure 12:
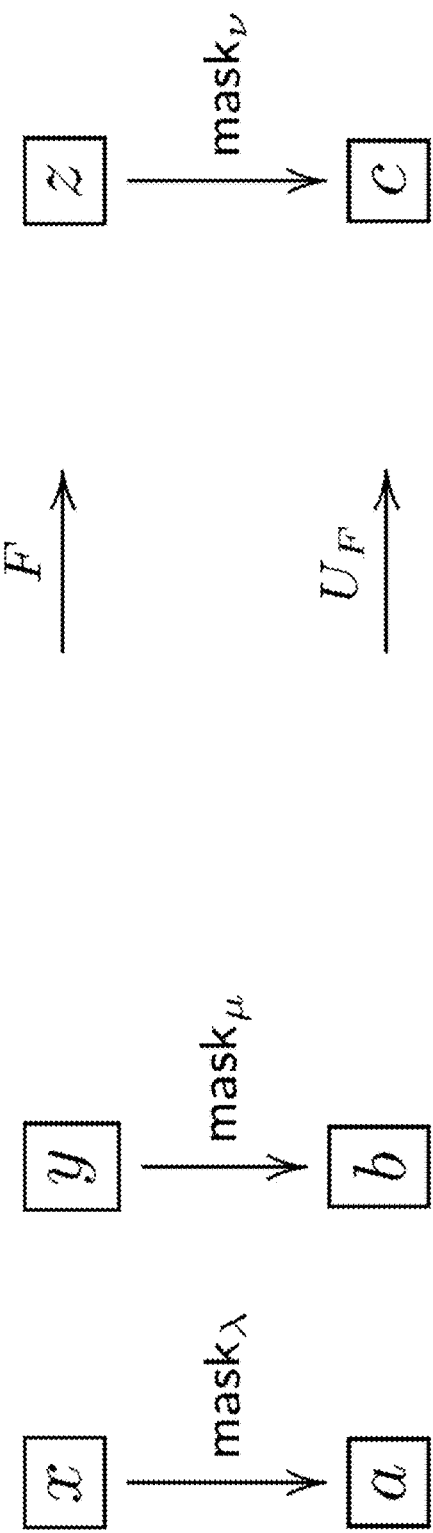
FIG. 12 illustrates a diagram of two example functions.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

I. HIGH-PRECISION PRIVACY-PRESERVING REAL-VALUED FUNCTION EVALUATION

0 Overview

We propose a novel multi-party computation protocol for evaluating continuous real-valued functions with high numerical precision. Our method is based on approximations with Fourier series and uses at most two rounds of communication during the online phase. For the offline phase, we propose a trusted-dealer and honest-but-curious aided solution, respectively. We apply our method to train a logistic regression classifier via a variant of Newton's method (known as IRLS) to compute unbalanced classification problems that detect rare events and cannot be solved using previously proposed privacy-preserving optimization methods (e.g., based on piecewise-linear approximations of the sigmoid function). Our protocol is efficient as it can be implemented using standard quadruple-precision floating point arithmetic. We report multiple experiments and provide a demo application that implements our method for training a logistic regression model.

1 Introduction

Privacy-preserving computing allows multiple parties to evaluate a function while keeping the inputs private and revealing only the output of the function and nothing else. Recent advances in multi-party computation (MPC), homomorphic encryption, and differential privacy made these models practical. An example of such computations, with applications in medicine and finance, among others, is the training of supervised models where the input data comes from distinct secret data sources [17], [23], [25], [26] and the evaluation of predictions using these models.

In machine learning classification problems, one trains a model on a given dataset to predict new inputs, by mapping them into discrete categories. The classical logistic regression model predicts a class by providing a probability associated with the prediction. The quality of the model can be measured in several ways, the most common one being the accuracy that indicates the percentage of correctly predicted answers.

It appears that for a majority of the datasets (e.g., the MNIST database of handwritten digits [15] or the ARCENE dataset [14]), the classification achieves very good accuracy after only a few iterations of the gradient descent using a piecewise-linear approximation of the sigmoid function sigmo: $\mathbb{R} \to [0, 1]$ defined as $$sigmo(x) = \frac{1}{1+e^{-x}},$$

although the current cost function is still far from the minimum value [25]. Other approximation methods of the sigmoid function have also been proposed in the past. In [29], an approximation with low degree polynomials resulted in a more efficient but less accurate method. Conversely, a higher-degree polynomial approximation applied to deep learning methods in [24] yielded more accurate, but less efficient methods (and thus, less suitable for privacy-preserving computing). In parallel, approximation solutions for privacy-preserving methods based on homomorphic encryption [2], [27], [18], [22] and differential privacy [1], [10] have been proposed in the context of both classification methods and deep learning.

Nevertheless, accuracy itself is not always a sufficient measure for the quality of the model, especially if, as mentioned in [19, p. 423], our goal is to detect a rare event such as a rare disease or a fraudulent financial transaction. If, for example, one out of every one thousand transactions is fraudulent, a naïve model that classifies all transactions as honest achieves 99.9% accuracy; yet this model has no predictive capability. In such cases, measures such as precision, recall and F1-score allow for better estimating the quality of the model. They bound the rates of false positives or negatives relative to only the positive events rather than the whole dataset.

The techniques cited above achieve excellent accuracy for most balanced datasets, but since they rely on a rough approximation of the sigmoid function, they do not converge to the same model and thus, they provide poor scores on datasets with a very low acceptance rate. In this paper, we show how to regain this numerical precision in MPC, and to reach the same score as the plaintext regression. Our MPC approach is mostly based on additive secret shares with precomputed multiplication numerical masking data [4]. This means that the computation is divided in two phases: an offline phase that can be executed before the data is shared between the players (also referred to as parties or party computing systems), and an online phase that computes the actual result. For the offline phase, we propose a first solution based on a trusted dealer, and then discuss a protocol where the dealer is honest-but-curious. The dealer or trusted dealer can also be referred to as a dealer computing system.

1.1 Our Contributions

A first contribution is a Fourier approximation of the sigmoid function. Evaluation of real-valued functions has been widely used in privacy-preserving computations. For instance, in order to train linear and logistic regression models, one is required to compute real-valued functions such as the square root, the exponential, the logarithm, the sigmoid or the softmax function and use them to solve non-linear optimization problems. In order to train a logistic regression model, one needs to minimize a cost function which is expressed in terms of logarithms of the continuous sigmoid function. This minimum is typically computed via iterative methods such as the gradient descent. For datasets with low acceptance rate, it is important to get much closer to the exact minimum in order to obtain a sufficiently precise model. We thus need to significantly increase the number of iterations (naïve or stochastic gradient descent) or use faster-converging methods (e.g., IRLS [5, § 4.3]). The latter require a numerical approximation of the sigmoid that is much better than what was previously achieved in an MPC context, especially when the input data is not normalized or feature-scaled. Different approaches have been considered previously such as approximation by Taylor series around a point (yielding only good approximation locally at that point), or polynomial approximation (by e.g., estimating least squares). Although better than the first one, this method is numerically unstable due to the variation of the size of the coefficients. An alternative method based on approximation by piecewise-linear functions has been considered as well. In MPC, this method performs well when used with garbled circuits instead of secret sharing and masking, but does not provide enough accuracy.

In our case, we approximate the sigmoid using Fourier series, an approach applied for the first time in this context. This method works well as it provides a better uniform approximation assuming that the function is sufficiently smooth (as is the case with the sigmoid). In particular, we virtually re-scale and extend the sigmoid to a periodic function that we approximate with a trigonometric polynomial which we then evaluate in a stable privacy-preserving manner. To approximate a generic function with trigonometric polynomials that can be evaluated in MPC, one either uses the Fourier series of a smooth periodic extension or finds directly the closest trigonometric polynomial by the method of least squares for the distance on the half-period. The first approach yields a superalgebraic convergence at best, whereas the second converges exponentially fast. On the other hand, the first one is numerically stable whereas the second one is not (under the standard Fourier basis). In the case of the sigmoid, we show that one can achieve both properties at the same time.

A second contribution is a Floating-point representation and masking. A typical approach to multi-party computation protocols with masking is to embed fixed-point values into finite groups and use uniform masking and secret sharing. Arithmetic circuits can then be evaluated using, e.g., precomputed multiplication numerical masking data and following Beaver's method [4]. This idea has been successfully used in [13] and [12]. Whereas the method works well on low multiplicative depth circuits like correlations or linear regression [17], in general, the required group size increases exponentially with the multiplicative depth. In [25], this exponential growth is mitigated by a two-party rounding solution, but the technique does not extend to three or more players where an overflow in the most significant bits can occur. In this work, we introduce an alternative sharing scheme, where fixed-point values are shared directly using (possibly multibit) floating points, and present a technique to reduce the share sizes after each multiplication. This technique easily extends to an arbitrary number of players.

A third contribution is a significant reduction in communication time. In this paper, we follow the same approach as in [25] and define dedicated numerical masking data for high-level instructions, such as large matrix multiplications, a system resolution, or an oblivious evaluation of the sigmoid. This approach is less generic than masking low-level instructions as in SPDZ, but it allows to reduce the communication and memory requirements by large factors. Masks and operations are aware of the type of vector or matrix dimensions and benefit from the vectorial nature of the high-level operations. For example, multiplying two matrices requires a single round of communication instead of up to $O(n^3)$ for coefficient-wise approaches, depending on the batching quality of the compiler. Furthermore, masking is defined per immutable variable rather than per elementary operation, so a constant matrix is masked only once during the whole method. Combined with non-trivial local operations, these numerical masking data can be used to achieve much more than just ring additions or multiplications. In a nutshell, the amount of communications is reduced as a consequence of reusing the same masks, and the number of communication rounds is reduced as a consequence of masking directly matrices and other large structures. Therefore, the total communication time becomes negligible compared to the computing cost.

A fourth contribution is a new protocol for the honest but curious offline phase extendable to n players. We introduce a new protocol for executing the offline phase in the honest-but-curious model that is easily extendable to a generic number n of players while remaining efficient. To achieve this, we use a broadcast channel instead of peer-to-peer communication which avoids a quadratic explosion in the number of communications. This is an important contribution, as none of the previous protocols for n>3 players in this model are efficient. In [17], for instance, the authors propose a very efficient method in the trusted dealer model; yet the execution time of the oblivious transfer protocol is quite slow.

2 Notation and Preliminaries

Assume that $P_1, \ldots, P_n$ are distinct computing parties (players). We recall some basic concepts from multi-party computation that will be needed for this paper.

2.1 Secret Sharing and Masking

Let $(G, \cdot)$ be a group and let $x \in G$ be a group element. A secret share of x, denoted by $[\![ x ]\!] \cdot$ (by a slight abuse of notation), is a tuple $(x_1, \ldots, x_n) \in G^n$ such that $x = x_1 \cdot \ldots \cdot x_n$. If $(G, +)$ is abelian, we call the secret shares $x_1, \ldots, x_n$ additive secret shares. A secret sharing scheme is computationally secure if for any two elements x, y∈G, strict sub-tuples of shares $[\![ x ]\!] \cdot$ or $[\![ y ]\!] \cdot$ are indistinguishable. If G admits a uniform distribution, an information-theoretic secure secret sharing scheme consists of drawing $x_1, \ldots, x_{n-1}$ uniformly at random and choosing $x_n = x_{n-1}^{-1} \cdot \ldots \cdot x_1^{-1} \cdot x$. When G is not compact, the condition can be relaxed to statistical or computational indistinguishability.

A closely related notion is the one of group masking. Given a subset X of G, the goal of masking X is to find a distribution D over G such that the distributions of x·D for x∈X are all indistinguishable. Indeed, such distribution can be used to create a secret share: one can sample $\lambda \leftarrow D$, and give $\lambda^{-1}$ to a player and x·X to the other. Masking can also be used to evaluate non-linear operations in clear over masked data, as soon as the result can be privately unmasked via homomorphisms (as in, e.g., the Beaver's triplet multiplication technique [4]).

2.2 Arithmetic with Secret Shares Via Masking

Computing secret shares for a sum x+y (or a linear combination if (G, +) has a module structure) can be done non-interactively by each player by adding the corresponding shares of x and y. Computing secret shares for a product is more challenging. One way to do that is to use an idea of Beaver based on precomputed and secret shared multiplicative numerical masking data. From a general point of view, let $(G_1, +)$, $(G_2, +)$ and $(G_3, +)$ be three abelian groups and let $\pi: G_1 \times G_2 \rightarrow G_3$ be a bilinear map.

Given additive secret shares $[\![ x ]\!]_+$ and $[\![ y ]\!]_+$ for two elements $x \in G_1$ and $y \in G_2$, we would like to compute secret shares for the element $\pi(x,y) \in G_3$. With Beaver's method, the players must employ precomputed single-use random numerical masking data $([\![ \lambda ]\!]_+, [\![ \mu ]\!]_+, [\![ \pi(\lambda, \mu) ]\!]_+)$ for $\lambda \in G_1$ and $\mu \in G_2$, and then use them to mask and reveal $a = x + \lambda$ and $b = y + \mu$. The players then compute secret shares for $\pi(x,y)$ as follows:

Player 1 computes $z_1 = \pi(a,b) - \pi(a,\mu_1) - \pi(\lambda_1,b) + (\pi(\lambda,\mu))_1$;
Player i (for i=2, ..., n) computes $z_i = -\pi(a,\mu_i) - \pi(\lambda_i,b) + (\pi(\Delta,\mu))_i$.

The computed $z_1, \ldots, z_n$ are the additive shares of $\pi(x,y)$. A given A can be used to mask only one variable, so one triplet (more generally, set of numerical masking data) must be precomputed for each multiplication during the offline phase (i.e. before the data is made available to the players). Instantiated with the appropriate groups, this abstract scheme allows to evaluate a product in a ring, but also a vectors dot product, a matrix-vector product, or a matrix-matrix product.

2.3 MPC Evaluation of Real-Valued Continuous Functions

For various applications (e.g., logistic regression in Section 6, below), we need to compute continuous real-valued functions over secret shared data. For non-linear functions (e.g. exponential, log, power, cos, sin, sigmoid, etc.), different methods are proposed in the literature.

A straightforward approach consists of implementing a full floating point arithmetic framework [6, 12], and to compile a data-oblivious method that evaluates the function over floats. This is for instance what Sharemind and SPDZ use. However, these two generic methods lead to prohibitive running times if the floating point function has to be evaluated millions of times.

The second approach is to replace the function with an approximation that is easier to compute: for instance, [25] uses garbled circuits to evaluate fixed point comparisons and absolute values; it then replaces the sigmoid function in the logistic regression with a piecewise-linear function. Otherwise, [24] approximates the sigmoid with a polynomial of fixed degree and evaluates that polynomial with the Horner method, thus requiring a number of rounds of communications proportional to the degree.

Another method that is close to how SPDZ [13] computes inverses in a finite field is based on polynomial evaluation via multiplicative masking: using precomputed numerical masking data of the form ($[\![\lambda]\!]_+, [\![\lambda^{-1}]\!]_+, \ldots, [\![\lambda^{-p}]\!]_+$), players can evaluate $$P(x) = \sum_{i=0}^{p} a_p x^p$$

by revealing $u=x\lambda$ and outputting the linear combination $$\sum_{i=0}^{p} a_i u^i [\![\lambda^{-i}]\!]_+.$$

Multiplicative masking, however, involves some leakage: in finite fields, it reveals whether x is null. The situation gets even worse in finite rings where the multiplicative orbit of x is disclosed (for instance, the rank would be revealed in a ring of matrices), and over $\mathbb{R}$, the order of magnitude of x would be revealed.

For real-valued polynomials, the leakage could be mitigated by translating and rescaling the variable x so that it falls in the range [1, 2). Yet, in general, the coefficients of the polynomials that approximate the translated function explode, thus causing serious numerical issues.

2.4 Full Threshold Honest-but-Curious Protocol

Since our goal is to emphasize new functionalities, such as efficient evaluation of real-valued continuous functions and good quality logistic regression, we often consider a scenario where all players follow the protocol without introducing any errors. The players may, however, record the whole transaction history and try to learn illegitimate information about the data. During the online phase, the security model imposes that any collusion of at most n−1 players out of n cannot distinguish any semantic property of the data beyond the aggregated result that is legitimately and explicitly revealed. To achieve this, Beaver triplets (also referred to as numerical masking data, used to mask player's secret shares) can be generated and distributed by a single entity called the trusted dealer. In this case, no coalition of at most n−1 players should get any computational advantage on the plaintext numerical masking data information. However, the dealer himself knows the plaintext numerical masking data, and hence the whole data, which only makes sense on some computation outsourcing use-cases. In Section 5, below, we give an alternative honest-but-curious (or semi-honest) protocol to generate the same numerical masking data, involving this time bi-directional communications with the dealer. In this case, the dealer and the players collaborate during the offline phase in order to generate the precomputed material, but none of them have access to the whole plaintext numerical masking data. This makes sense as long as the dealer does not collude with any player, and at least one player does not collude with the other players. We leave the design of actively secure protocols for future work.

3 Statistical Masking and Secret Share Reduction

In this section, we present our masking technique for fixed-point arithmetic and provide an method for the MPC evaluation of real-valued continuous functions. In particular, we show that to achieve p bits of numerical precision in MPC, it suffices to have p+2τ-bit floating points where r is a fixed security parameter.

The secret shares we consider are real numbers. We would like to mask these shares using floating point numbers. Yet, as there is no uniform distribution on $\mathbb{R}$, no additive masking distribution over reals can perfectly hide the arbitrary inputs. In the case when the secret shares belong to some known range of numerical precision, it is possible to carefully choose a masking distribution, depending on the precision range, so that the masked value computationally leaks no information about the input. A distribution with sufficiently large standard deviation could do the job: for the rest of the paper, we refer to this type of masking as "statistical masking". In practice, we choose a normal distribution with standard deviation $\sigma=2^{40}$.

On the other hand, by using such masking, we observe that the sizes of the secret shares increase every time we evaluate the multiplication via Beaver's technique (Section 2.2). In Section 3.3, we address this problem by introducing a technique that allows to reduce the secret share sizes by discarding the most significant bits of each secret share (using the fact that the sum of the secret shares is still much smaller than their size).

3.1 Floating Point, Fixed Point and Interval Precision

Suppose that B is an integer and that p is a non-negative integer (the number of bits). The class of fixed-point numbers of exponent B and numerical precision p is:

$$C(B,p)=\{x \in 2^{B-p} \cdot \mathbb{Z}, |x| \leq 2^B\}.$$

Each class C(B,p) is finite, and contains $2^{p+1}+1$ numbers. They could be rescaled and stored as (p+2)-bit integers. Alternatively, the number $x \in C(B,p)$ can also be represented by the floating point value x, provided that the floating point representation has at least p bits of mantissa. In this case, addition and multiplication of numbers across classes of the same numerical precision are natively mapped to floating-point arithmetic. The main arithmetic operations on these classes are:

Lossless Addition: $C(B_1,p_1) \times C(B_2,p_2) \to C(B,p)$ where $B=\max(B_1, B_2)+1$ and $p=B-\min(B_1-p_1, B_2-p_2)$;

Lossless Multiplication: $C(B_1,p_1) \times C(B_2,p_2) \to C(B,p)$ where $B=B_1+B_2$ and $p=p_1+p_2$;

Rounding: $C(B_1,p_1) \to C(B,p)$, that maps x to its nearest element in $2^{B-p} \mathbb{Z}$.

Lossless operations require p to increase exponentially in the multiplication depth, whereas fixed precision operations maintain p constant by applying a final rounding. Finally, note that the exponent B should be incremented to store the result of an addition, yet, B is a user-defined parameter in fixed point arithmetic. If the user forcibly chooses to keep B unchanged, any result $|x|>2^B$ will not be representable in the output domain (we refer to this type of overflow as plaintext overflow).

3.2 Floating Point Representation

Given a security parameter τ, we say that a set S is a τ-secure masking set for a class C(B,p) if the following distinguishability game cannot be won with advantage $\geq 2-\tau$: the adversary chooses two plaintexts $m_0$, $m_1$ in C(B,p), a challenger picks $b \in \{0, 1\}$ and $\alpha \in S$ uniformly at random, and sends $c=m_b+\alpha$ to the adversary. The adversary has to guess b. Note that increasing such distinguishing advantage from $2^{-\tau}$ to $\approx \frac{1}{2}$ would require to give at least $2^\tau$ samples to the attacker, so τ=40 is sufficient in practice.

Proposition 1. The class $C(B,p,\tau)=\{\alpha \in 2^{B-p} \mathbb{Z}, |\alpha| 2^{B+\tau}\}$ is a τ-secure masking set for C(B,p)

Proof. If a, b∈C(B,p) and U is the uniform distribution on C(B,p,τ), the statistical distance between a+U and b+U is $(b-a) \cdot 2^{p-B}/\#C(B,p,\tau) \leq 2^{-\tau}$. This distance upper-bounds any computational advantage. ∎

Again, the class $C(B,p,\tau)=C(B+\tau, p+\tau)$ fits in floating point numbers of $p+\tau$-bits of mantissa, so they can be used to securely mask fixed point numbers with numerical precision p. By extension, all additive shares for $C(B,p)$ will be taken in $C(B,p,\tau)$.

We now analyze what happens if we use Beaver's protocol to multiply two plaintexts $x \in C(B_1,p)$ and $y \in C(B_2,p)$. The masked values $x+\lambda$ and $y+\mu$ are bounded by $2^{B_1+\tau}$ and $2^{B_2+\tau}$ respectively. Since the mask $\lambda$ is also bounded by $2^{B_1+\tau}$ and $\mu$ by $2^{B_2+\tau}$, the computed secret shares of $x \cdot y$ will be bounded by $2^{B_1+B_2+2\tau}$. So the lossless multiplication sends $C(B_1,p,\tau) \times C(B_2,p,\tau) \to C(B,2p,2\tau)$ where $B=B_1+B_2$ instead of $C(B,p,\tau)$. Reducing p is just a matter of rounding, and it is done automatically by the floating point representation. However, we still need a method to reduce r, so that the output secret shares are bounded by $2^{B+\tau}$.

3.3 Secret Share Reduction Method

The method we propose depends on two auxiliary parameters: the cutoff, defined as $\eta=B+\tau$ so that $2^\eta$ is the desired bound in absolute value, and an auxiliary parameter $M=2^k$ larger than the number of players.

The main idea is that the initial share contains large components $z_1, \ldots, z_n$ that sum up to the small secret shared value z. Additionally, the most significant bits of the share beyond the cutoff position (say $MSB(z_i)=\lfloor z_i/2^\eta \rfloor$) do not contain any information on the data, and are all safe to reveal. We also know that the MSB of the sum of the shares (i.e. MSB of the data) is null, so the sum of the MSB of the shares is very small. The share reduction method simply computes this sum, and redistributes it evenly among the players. Since the sum is guaranteed to be small, the computation is done modulo M rather than on large integers. More precisely, using the cutoff parameter $\eta$, for $i=1, \ldots, n$, player i writes his secret share $z_i$ of z as $z_i=u_i+2^\eta v_i$, with $v_i \in \mathbb{Z}$ and $u_i \in [-2^{\eta-1}, 2^{\eta-1})$. Then, he broadcasts $v_i$ mod M, so that each player computes the sum. The individual shares can optionally be re-randomized using a precomputed share $[\![v]\!]_+$, with $v=0$ mod M. Since $w=\Sigma v_i$'s is guaranteed to be between $-M/2$ and $M/2$, it can be recovered from its representation mod M. Thus, each player locally updates its share as $u_i+2^\eta w/n$, which have by construction the same sum as the original shares, but are bounded by $2^\eta$.

3.4 Mask Reduction Method

The following method details one embodiment for reducing the size of the secret shares as described above in Section 3.3. This procedure can be used inside the classical MPC multiplication involving floating points.

Input: $[\![z]\!]_+$ and one set of numerical masking data $[\![v]\!]_+$, with $v=0$ mod M.
Output: Secret shares for the same value z with smaller absolute values of the shares.
1: Each player $P_i$ computes $u_i \in [-2^{\eta-1}, 2^{\eta-1})$ and $v_i \in \mathbb{Z}$, such that $z_i=u_i+2^\eta v_i$.
2: Each player $P_i$ broadcasts $v_i+v_i$ mod M to other players.
3: The players compute $$w = \frac{1}{n}\left(\sum_{i=1}^{n}(v_i + v_i) \bmod M\right).$$

4: Each player $P_i$ computes the new share of z as $z_i'=u_i+2^\eta w$.

4 Fourier Approximation

Fourier theory allows us to approximate certain periodic functions with trigonometric polynomials. The goal of this section is two-fold: to show how to evaluate trigonometric polynomials in MPC and, at the same time, to review and show extensions of some approximation results to non-periodic functions.

4.1 Evaluation of Trigonometric Polynomials or Fourier Series in MPC

Recall that a complex trigonometric polynomial is a finite sum of the form $$t(x) = \sum_{m=-P}^{P} c_m e^{imx},$$

where $C_m \in \mathbb{C}$ L is equal to $a_m+ib_m$, with $a_m, b_m \in \mathbb{R}$. Each trigonometric polynomial is a periodic function with period $2\pi$. If $c_{-m}=\overline{c_m}$ for all $m \in \mathbb{Z}$, then t is real-valued, and corresponds to the more familiar cosine decomposition $$t(x) = a_0 + \sum_{m=1}^{N} a_m \cos(mx) + b_m \sin(mx).$$

Here, we describe how to evaluate trigonometric polynomials in an MPC context, and explain why it is better than regular polynomials.

We suppose that, for all m, the coefficients $a_m$ and $b_m$ of t are publicly accessible and they are $0 \le a_m, b_m \le 1$. As t is $2\pi$ periodic, we can evaluate it on inputs modulo $2\pi$. Remark that as $\mathbb{R}$ mod $2\pi$ admits a uniform distribution, we can use a uniform masking: this method completely fixes the leakage issues that were related to the evaluation of classical polynomials via multiplicative masking. On the other hand, the output of the evaluation is still in $\mathbb{R}$: in this case we continue using the statistical masking described in previous sections. The inputs are secretly shared and additively masked: for sake of clarity, to distinguish the classical addition over reals from the addition modulo $2\pi$, we temporarily denote this latter by $\oplus$. In the same way, we denote the additive secret shares with respect to the addition modulo $2\pi$ by $[\![\cdot]\!]_\oplus$. Then, the transition from $[\![\cdot]\!]_+$ to $[\![\cdot]\!]_\oplus$ can be achieved by trivially reducing the shares modulo $2\pi$.

Then, a way to evaluate t on a secret shared input $[\![x]\!]_+=(x_1, \ldots, x_n)$ is to convert $[\![x]\!]_+$ to $[\![x]\!]_\oplus$ and additively mask it with a shared masking $[\![\lambda]\!]_\oplus$, then reveal $x \oplus \lambda$ and rewrite our target $[\![e^{imx}]\!]_+$ as $e^{im(x \oplus \lambda)}$. $[\![e^{im(-\lambda)}]\!]_+$. Indeed, since $x \oplus \lambda$ is revealed, the coefficient $e^{im(x \oplus \lambda)}$ can be computed in clear. Overall, the whole trigonometric polynomial t can be evaluated in a single round of communication, given precomputed trigonometric polynomial or Fourier series masking data such as ($[\![\lambda]\!]_\oplus$, $[\![e^{-i\lambda}]\!]_+, \ldots, [\![e^{-i\lambda P}]\!]_+$) and thanks to the fact that $x \oplus \lambda$ has been revealed.

Also, we notice that to work with complex numbers of absolute value 1 makes the method numerically stable, compared to power functions in regular polynomials. It is for this reason that the evaluation of trigonometric polynomials is a better solution in our context.

4.2 Approximating Non-Periodic Functions

If one is interested in uniformly approximating (with trigonometric polynomials on a given interval, e.g. $[-\pi/2,$ $\pi/2]$) a non-periodic function $f$, one cannot simply use the Fourier coefficients. Indeed, even if the function is analytic, its Fourier series need not converge uniformly near the end-points due to Gibbs phenomenon.

4.2.1 Approximations Via $C^\infty$-Extensions.

One way to remedy this problem is to look for a periodic extension of the function to a larger interval and look at the convergence properties of the Fourier series for that extension. To obtain exponential convergence, the extension needs to be analytic too, a condition that can rarely be guaranteed. In other words, the classical Whitney extension theorem [28] will rarely yield an analytic extension that is periodic at the same time. A constructive approach for extending differentiable functions is given by Hestenes [20] and Fefferman [16] in a greater generality. The best one can hope for is to extend the function to a $C^\infty$-function (which is not analytic). As explained in [8], [9], such an extension yields a super-algebraic approximation at best that is not exponential.

4.2.2 Least-Square Approximations.

An alternative approach for approximating a non-periodic function with trigonometric functions is to search for these functions on a larger interval (say $[-\pi, \pi]$), such that the restriction (to the original interval) of the $L^2$-distance between the original function and the approximation is minimized. This method was first proposed by [7], but it was observed that the coefficients with respect to the standard Fourier basis were numerically unstable in the sense that they diverge (for the optimal solution) as one increases the number of basis functions. The method of [21] allows to remedy this problem by using a different orthonormal basis of certain half-range Chebyshev polynomials of first and second kind for which the coefficients of the optimal solution become numerically stable. In addition, one is able to calculate numerically these coefficients using a Gaussian quadrature rule.

4.2.2.1 Approximation of Functions by Trigonometric Polynomial Over the Half Period Let $f$ be a square-integrable function on the interval $[-\pi/2, \pi/2]$ that is not necessarily smooth or periodic.

4.2.2.1.1 the Approximation Problem

Consider the set $$G_n = \left\{ g(x) = \frac{a_0}{2} + \sum_{k=1}^{n} a_k \sin(kx) + \sum_{k=1}^{n} b_k \cos(kx) \right\}$$

of $2\pi$-periodic functions and the problem $$g_n(x) = \operatorname{argmin}_{g \in G_n} \|f - g\|_{L_{[-\pi/2, \pi/2]}}^2.$$

As it was observed in [7], if one uses the naïve basis to write the solutions, the Fourier coefficients of the functions $g_n$ are unbounded, thus resulting in numerical instability. It was explained in [21] how to describe the solution in terms of two families of orthogonal polynomials closely related to the Chebyshev polynomials of the first and second kind. More importantly, it is proved that the solution converges to $f$ exponentially rather than super-algebraically and it is shown how to numerically estimate the solution $g_n(x)$ in terms of these bases.

We will now summarize the method of [21]. Let $$C_n = \frac{1}{\sqrt{2}} \cup \{\cos(kx) : k = 1, \ldots, n\}$$

and let $\mathbb{C}_n$ be the $\mathbb{R}$-vector space spanned by these functions (the subspace of even functions). Similarly, let $$S_n = \{\sin(kx) : k = 1, \ldots, n\},$$

and let $\mathbb{S}_n$ be the $\mathbb{R}$-span of $S_n$ (the space of odd functions). Note that $C_n \cup S_n$ is a basis for $G_n$.

4.2.2.1.2 Chebyshev's Polynomials of First and Second Kind

Let $T_k(y)$ for $y \in [-1, 1]$ be the kth Chebyshev polynomial of first kind, namely, the polynomial satisfying $T_k(\cos \theta) = \cos k\theta$ for all $\theta$ and normalized so that $T_k(1) = 1$ ($T_k$ has degree k). As k varies, these polynomials are orthogonal with respect to the weight function $w_1(y) = 1/\sqrt{1-y^2}$. Similarly, let $U_k(y)$ for $y \in [-1, 1]$ be the kth Chebyshev polynomial of second kind, i.e., the polynomial satisfying $U_k(\cos \theta) = \sin((k+1)\theta)/\sin \theta$ and normalized so that $U_k(1) = k+1$. The polynomials $\{U_k(y)\}$ are orthogonal with respect to the weight function $w_2(y) = \sqrt{1-y^2}$.

It is explained in [21, Thm.3.3] how to define a sequence $\{T_k^h\}$ of half-range Chebyshev polynomials that form an orthonormal bases for the space of even functions. Similarly, [21, Thm.3.4] yields an orthonormal basis $\{U_k^h\}$ for the odd functions (the half-range Chebyshev polynomials of second kind). According to [21, Thm.3.7], the solution $g_n$ to the above problem is given by $$g_n(x) = \sum_{k=0}^{n} a_k T_k^h(\cos x) + \sum_{k=0}^{n-1} b_k U_k^h(\cos x) \sin x,$$

where $$a_k = \frac{2}{\pi} \int_{-\frac{\pi}{2}}^{\frac{\pi}{2}} f(x) T_k^h(\cos x) dx,$$

and $$b_k = \frac{2}{\pi} \int_{-\frac{\pi}{2}}^{\frac{\pi}{2}} f(x) U_k^h(\cos x) \sin x \, dx.$$

While it is numerically unstable to express the solution $g_n$ in the standard Fourier basis, it is stable to express them in terms of the orthonormal basis $\{T_k^h\} \cup \{U_k^h\}$. In addition, it is shown in [21, Thm.3.14] that the convergence is exponential. To compute the coefficients $a_k$ and $b_k$ numerically, one uses Gaussian quadrature rules as explained in [21, § 5].

4.2.3 Approximating the Sigmoid Function.

We now restrict to the case of the sigmoid function over the interval $[-B/2, B/2]$ for some $B>0$. We can rescale the variable to approximate $g(x) = \operatorname{sigmo}(Bx/\pi)$ over $[-\pi/2, \pi/2]$. If we extend g by anti-periodicity (odd-even) to the interval $[\pi/2, 3\pi/2]$ with the mirror condition $g(x) = g(\pi - x)$, we obtain a continuous $2\pi$-periodic piecewise $C^1$ function. By Dirichlet's global theorem, the Fourier series of g converges uniformly over $\mathbb{R}$, so for all $\varepsilon > 0$, there exists a degree N and a trigonometric polynomial $g_N$ such that $\|g_N - g\|_\infty \le \varepsilon$. To compute sigmo(t) over secret shared t, we first apply the affine change of variable (which is easy to evaluate in MPC), to get the corresponding $x \in [-\pi/2, \pi/2]$, and then we evaluate the trigonometric polynomial $g_N(x)$ using Fourier numerical masking data. This method is sufficient to get 24 bits of precision with a polynomial of only 10 terms, however asymptotically, the convergence rate is only in $\Theta(n^{-2})$ due to discontinuities in the derivative of g. In other words, approximating g with $\lambda$ bits of precision requires to evaluate a trigonometric polynomial of degree $2^{\lambda/2}$. Luckily, in the special case of the sigmoid function, we can compute this degree polynomial by explicitly constructing a $2\pi$-periodic analytic function that is exponentially close to the rescaled sigmoid on the whole interval $[-\pi, \pi]$ (not the half interval). Besides, the geometric decay of the coefficients of the trigonometric polynomial ensures perfect numerical stability. The following theorem summarizes this construction.

Theorem 1. Let $h_\alpha(x)=1/(1+e^{-\alpha x})-x/2\pi$ for $x \in (-\pi,\pi)$. For every $\varepsilon>0$, there exists $\alpha=O(\log(1/\varepsilon))$ such that $h_\alpha$ is at uniform distance $\varepsilon/2$ from a $2\pi$-periodic analytic function g. There exists $N=O(\log^2(1/\varepsilon))$ such that the Nth term of the Fourier series of g is at distance $\varepsilon/2$ of g, and thus, at distance $\leq \varepsilon$ from $h_\alpha$.

We now prove Theorem 1, with the following methodology. We first bound the successive derivatives of the sigmoid function using a differential equation. Then, since the first derivative of the sigmoid decays exponentially fast, we can sum all its values for any x modulo $2\pi$, and construct a $C^\infty$ periodic function, which approximates tightly the original function over $[-\pi,\pi]$. Finally, the bounds on the successive derivatives directly prove the geometric decrease of the Fourier coefficients.

Proof. First, consider the $\sigma(x)=1/(1+e-x)$ the sigmoid function over $\mathbb{R}$. $\sigma$ satisfies the differential equation $\sigma'=\sigma-\sigma^2$. By derivating n times, we have $$\sigma^{(n+1)} = \sigma^{(n)} - \sum_{k=0}^{n} \binom{n}{k} \sigma^{(k)} \sigma^{(n-k)} = \sigma^{(n)}(1-\sigma) - \sum_{k=1}^{n} \binom{n}{k} \sigma^{(k)} \sigma^{(n-k)}.$$

Dividing by $(n+1)!$, this yields $$\left|\frac{\sigma^{(n+1)}}{(n+1)!}\right| \leq \frac{1}{n+1}\left(\left|\frac{\sigma^{(n)}}{n!}\right| + \sum_{k=1}^{n} \left|\frac{\sigma^{(k)}}{k!}\right|\left|\frac{\sigma^{(n-k)}}{(n-k)!}\right|\right)$$

From there, we deduce by induction that for all $n \geq 0$ and for all $x \Sigma \mathbb{R}$, $$\left|\frac{\sigma^{(n)}(x)}{n!}\right| \leq 1$$

and it decreases with n, so for all $n \geq 1$, $$|\sigma^{(n)}(x)| \leq n! |\sigma'(x)| \leq n! e^{-|x|}.$$

FIG. 1 illustrates a graph of the odd-even periodic extension of the rescaled sigmoid. The rescaled sigmoid function g(ax) is extended by anti-periodicity from $$\left[-\frac{\pi}{2}; \frac{\pi}{2}\right]$$

to $$\left[\frac{\pi}{2}; \frac{3\pi}{2}\right].$$

This graph shows the extended function for $\alpha=1, 3, 5$. By symmetry, the Fourier series of the output function has only odd sinus terms: $0.5+\Sigma_{n \in N} \alpha_{2n+1} \sin((2n+1)x)$. For $\alpha=20/\pi$, the first Fourier form a rapidly decreasing sequence: [6.12 e-1, 1.51 e-1, 5.37 e-2, 1.99 e-2, 7.41 e-3, 2.75 e-3, 1.03 e-3, 3.82 e-4, 1.44 e-4, 5.14 e-5, 1.87 e-5, . . . ], which rapidly achieves 24 bits of precision. However, the sequence asymptotically decreases in $O(n^{-2})$ due to the discontinuity in the derivative in $$\frac{-\pi}{2},$$

so this method is not suitable to get an exponentially good approximation.

FIG. 2 illustrates an asymptotic approximation of the sigmoid via Theorem 1. As $\alpha$ grows, the discontinuity in the rescaled sigmoid function $$g(ax) - \frac{x}{2\pi}$$

vanishes, and it gets exponentially close to an analytic periodic function, whose Fourier coefficients decrease geometrically fast. This method is numerically stable, and can evaluate the sigmoid with arbitrary precision in polynomial time.

We now construct a periodic function that should be very close to the derivative of $h_\alpha$: consider $$g_a(x) = \sum_{k \in \mathbb{Z}} \frac{-\alpha}{(1+e^{-a(x-2k\pi)})(1+e^{a(x-2k\pi)})}.$$

By summation of geometric series, $g_\alpha$ is a well-defined infinitely derivable $2\pi$-periodic function over $\mathbb{R}$.. We can easily verify that for all $x \in (-\pi,\pi)$, the difference $$\left|h'_\alpha(x) - \frac{1}{2\pi} - g_a(x)\right|$$

is bounded by $2\alpha$.

$$\sum_{k=1}^{\infty} e^{a(x-2k\pi)} \leq \frac{2\alpha e^{-a\pi}}{1-e^{-2\pi a}},$$

so by choosing $$\alpha = \theta\left(\log\left(\frac{1}{\varepsilon}\right)\right),$$

this difference can be made smaller than $$\frac{\varepsilon}{2}.$$

We suppose now that $\alpha$ is fixed and we prove that $g_\alpha$ is analytic, i.e. its Fourier coefficients decrease exponentially fast. By definition, $g_\alpha(x)=\Sigma_{k\in\mathbb{Z}} \sigma(\alpha(x-2k\pi))$, so for all $p\in\mathbb{N}$, $g_\alpha^{(p)}(x)=\alpha^{p+1} \Sigma_{k\in\mathbb{Z}} \sigma^{(p+1)}(\alpha x-2\alpha k\pi)$, so $\|g_\alpha^{(p)}\|_\infty \leq 2\alpha^{p+1}(p+1)!$. This proves that the n-th Fourier coefficient $c_n(g_\alpha)$ is $$\leq \min_{p\in\mathbb{N}} \frac{2\alpha^{p+1}(p+1)}{n^p}.$$

This minimum is reached for $$p+1 \approx \frac{n}{\alpha},$$

and yields $|c_n(g_\alpha)|=O(e^{-n/\alpha})$.

Finally, this proves that by choosing $N\approx\alpha^2=\Theta(\log(1/\varepsilon)^2)$, the N-th term of the Fourier series of $g_\alpha$ is at distance $\leq\varepsilon$ of $g_\alpha$, and thus from $$h'_\alpha - \frac{1}{2\pi}.$$

This bound is preserved by integrating the trigonometric polynomial (the g from the theorem is the primitive of $g_\alpha$), which yields the desired approximation of the sigmoid over the whole interval $(-\pi,\pi)$. ∎

5 Honest but Curious Model

In the previous sections, we defined the shares of multiplication, power and Fourier numerical masking data, but did not explain how to generate them. Of course, a single trusted dealer approved by all players (TD model) could generate and distribute all the necessary shares to the players. Since the trusted dealer knows all the masks, and thus all the data, the TD model is only legitimate for few computation outsourcing scenarios.

We now explain how to generate the same numerical masking data efficiently in the more traditional honest-but-curious (HBC) model. To do so, we keep an external entity, called again the dealer, who participates in an interactive protocol to generate the numerical masking data, but sees only masked information. Since the numerical masking data in both the HBC and TD models are similar, the online phase is unchanged. Notice that in this HBC model, even if the dealer does not have access to the secret shares, he still has more power than the players. In fact, if one of the players wants to gain information on the secret data, he has to collude with all other players, whereas the dealer would need to collaborate with just one of them.

5.1 Honest but Curious Communication Channels

In what follows, we suppose that, during the offline phase, a private channel exists between each player and the dealer. In the case of an HBC dealer, we also assume that an additional private broadcast channel (a channel to which the dealer has no access) exists between all the players. Afterwards, the online phase only requires a public broadcast channel between the players. In practice, because of the underlying encryption, private channels (e.g., SSL connections) have a lower throughput (generally ≈20 MB/s) than public channels (plain TCP connections, generally from 100 to 1000 MB/s between cloud instances).

The figures presented in this section represent the communication channels between the players and the dealer in both the trusted dealer and the honest but curious models. Two types of communication channels are used: the private channels, that correspond in practice to SSL channels (generally <20 MB/s), and the public channels, corresponding in practice to TCP connections (generally from 100 MB to 1 GB/s). In the figures, private channels are represented with dashed lines, while public channels are represented with plain lines.

FIG. 3 illustrates a schematic of the connections during the offline phase of the MPC protocols in accordance with one embodiment. The figure shows the communication channels in both the trusted dealer model (left) and in the honest but curious model (right) used during the offline phase. In the first model, the dealer sends the numerical masking data to each player via a private channel. In the second model, the players have access to a private broadcast channel, shared between all of them and each player shares an additional private channel with the dealer. The private channels are denoted with dashed lines. The figure represents 3 players, but each model can be extended to an arbitrary number n of players. In the TD model, the dealer is the only one generating all the precomputed data. He uses private channels to send to each player his share of the numerical masking data (one-way arrows). In the HBC model, the players collaborate for the generation of the numerical masking data. To do that, they need an additional private broadcast channel between them, that is not accessible to the dealer.

FIG. 4 illustrates a schematic of the communication channels between players during the online phase in accordance with one embodiment. The figure shows the communication channels used during the online phase. The players send and receive masked values via a public broadcast channel (public channels are denoted with plain lines). Their number, limited to 3 in the example, can easily be extended to a generic number n of players. The online phase is the same in both the TD and the HBC models and the dealer is not present.

5.2 Honest but Curious Methods

The majority of HBC protocols proposed in the literature present a scenario with only 2 players. In [11] and [3], the authors describe efficient HBC protocols that can be used to perform a fast MPC multiplication in a model with three players. The two schemes assume that the parties follow correctly the protocol and that two players do not collude. The scheme proposed in [11] is very complex to scale for more than three parties, while the protocol in [3] can be extended to a generic number of players, but requires a quadratic number of private channels (one for every pair of players). We propose a different protocol for generating the multiplicative numerical masking data in the HBC scenario, that is efficient for any arbitrary number n of players. In our scheme, the dealer evaluates the non-linear parts in the numerical masking data generation, over the masked data produced by the players, then he distributes the masked shares. The mask is common to all players, and it is produced thanks to the private broadcast channel that they share. Finally, each player produces his numerical masking data by unmasking the precomputed data received from the dealer.

We now present in detail two methods in the honest-but-curious scenario: a first for the generation of multiplicative Beaver's numerical masking data, and a second for the generation of the numerical masking data used in the computation of a power function. In both methods, the dealer and the players collaborate for the generation of numerical masking data and none of them is supposed to have access to the whole information. The general idea is that the players generate their secret shares (of $\lambda$ and $\mu$, in the first case, and of $\lambda$ only, in the second case), that each one keeps secret. They also generate secret shares of a common mask, that they share between each other via the broadcast channel, but which remains secret to the dealer. The players then mask their secret shares with the common mask and send them to the dealer, who evaluates the non-linear parts (product in the first method and power in the second method). The dealer generates new additive shares for the result and sends these values back to each player via the private channel. This way, the players don't know each other's shares. Finally, the players, who know the common mask, can independently unmask their secret shares, and obtain their final share of the numerical masking data, which is therefore unknown to the dealer.

Honest but curious numerical masking data generation method

Output: Shares ($[\![\lambda]\!]$, $[\![\mu]\!]$, $[\![z]\!]$) with $z=\lambda\mu$.
1: Each player $P_i$ generates $a_i$, $b_i$, $\lambda_i$, $\mu_i$, (from the according distribution).
2: Each player $P_i$ shares with all other players $a_i$, $b_i$.
3: Each player computes $a=a_1+\ldots+a_n$ and $b=b_1+\ldots+b_n$.
4: Each player $P_i$ sends to the dealer $a_i+\lambda_i$ and $b_i+\mu_i$.
5: The dealer computes $a+\lambda$, $b+\mu$ and $w=(a+\lambda)(b+\mu)$.
6. The dealer creates $[\![w]\!]_+$ and sends $w_i$ to player $P_i$, for $i=1,\ldots,n$.
7: Player $P_1$ computes $z_i=w_1-ab-a\mu 1-b\lambda_1$.
8: Player i for $i=2,\ldots n$ computes $z_i=w_i-a\mu_i-b\lambda_i$.

Honest but curious numerical masking data generation for the power function method Output: Shares $[\![\lambda]\!]$ and $[\![\lambda^{-a}]\!]$.
1: Each player $P_i$ generates $\lambda_i$, $a_i$ (from the according distribution).
2: Each player $P_i$ shares with all other players $a_i$.
3: Each player computes $a=a_1+\ldots+a_n$.
4: Each player $P_i$ generates $z_i$ in a way that $\Sigma_{i=1}^{n}z_i=0$.
5: Each player Pi sends to the dealer $z_i+a\lambda_i$.
6: The dealer computes $\mu\lambda$ and $w=(\mu\lambda)^{-\alpha}$.
7. The dealer creates $[\![w]\!]_+$ and sends $w_i$ to player $P_i$, for $i=1,\ldots,n$.
8: Each player $P_i$ right-multiplies $w_i$ with $\mu^\alpha$ to obtain $(\lambda^{-\alpha})_i$.

We now present and a third method for the generation of numerical masking data used for the evaluation of a trigonometric polynomial in the HBC scenario.

Output: Shares ($[\![\lambda]\!]$, $[\![e^{im_1\lambda}]\!]_+,\ldots,[\![e^{im_N\lambda}]\!]_+$).
1: Each player $P_i$ generates $\lambda_i$, $a_i$ (uniformly modulo $2\pi$)
2: Each player $P_i$ broadcasts $a_i$ to all other players.
3: Each player computes $a=a_1+\ldots+a_n$ mod $2\pi$.
4: Each player $P_i$ sends to the dealer $\lambda_i+a_i$ mod $2\pi$.
5: The dealer computes $\lambda+a$ mod $2\pi$ and $w^{(1)}=e^{im_1(\lambda+a)},\ldots,w^{(N)}=e^{im_N(\lambda+a)}$ 6: The dealer creates $[\![w^{(1)}]\!]_+,\ldots,[\![w^{(N)}]\!]_+$ and sends $w^{(1)},\ldots,w^{(N)}$ to player $P_i$.
7: Each player $P_i$ multiplies each $w_i^{(j)}$ by $e^{-im_ja}$ to get $(e^{im_j\lambda})_i$, for all $j\in[1, N]$.

6 Application to Logistic Regression

In a classification problem one is given a data set, also called a training set, that we will represent here by a matrix $X\in M_{N,k}(\mathbb{R})$, and a training vector $y\in\{0, 1\}^N$. The data set consists of N input vectors of k features each, and the coordinate $y_i$ of the vector y corresponds to the class (0 or 1) to which the i-th element of the data set belongs to. Formally, the goal is to determine a function $h_\theta: \mathbb{R}^k \to \{0, 1\}$ that takes as input a vector x, containing k features, and which outputs $h_\theta(x)$ predicting reasonably well y, the corresponding output value.

In logistic regression, typically one uses hypothesis functions $h_\theta: \mathbb{R}^{k+1} \to [0, 1]$ of the form $h_\theta(x)=\text{sigmo}(\theta^T x)$, where $$\theta^T x = \sum_{i=0}^{k} \theta_i x_i \in \mathbb{R}$$

and $x_0=1$. The vector $\theta$, also called model, is the parameter that needs to be determined. For this, a convex cost function $C_{x,y}(\theta)$ measuring the quality of the model at a data point (x,y) is defined as $$C_{x,y}(\theta)=-y\log h_\theta(x)-(1-y)\log(1-h_\theta(x)).$$

The cost for the whole dataset is thus computed as $$\sum_{i=1}^{N} C_{x_i,y_i}(\theta).$$

The overall goal is to determine a model $\theta$ whose cost function is as close to 0 as possible. A common method to achieve this is the so called gradient descent which consists of constantly updating the model $\theta$ as $$\theta:=\theta-\alpha\nabla C_{x,y}(\theta),$$

where $C_{x,y}(\theta)$ is the gradient of the cost function and $\alpha>0$ is a constant called the learning rate. Choosing the optimal $\alpha$ depends largely on the quality of the dataset: if $\alpha$ is too large, the method may diverge, and if $\alpha$ is too small, a very large number of iterations are needed to reach the minimum. Unfortunately, tuning this parameter requires either to reveal information on the data, or to have access to a public fake training set, which is not always feasible in private MPC computations. This step is often silently ignored in the literature. Similarly, preprocessing techniques such as feature scaling, or orthogonalization techniques can improve the dataset, and allow to increase the learning rate significantly. But again, these techniques cannot easily be implemented when the input data is shared, and when correlation information should remain private.

In this work, we choose to implement the IRLS method [5, § 4.3], which does not require feature scaling, works with learning rate 1, and converges in much less iterations, provided that we have enough floating point precision. In this case, the model is updated as:

$$\theta:=\theta-H(\theta)^{-1}\cdot C_{x,y}(\theta),$$

where $H(\theta)$ is the Hessian matrix.

6.1 Implementation and Experimental Results

We implemented an MPC proof-of-concept of the logistic regression method in C++. We represented numbers in C(B,p) classes with 128-bit floating point numbers, and set the masking security parameter to $\tau=40$ bits. Since a 128-bit number has 113 bits of precision, and the multiplication method needs $2\tau=80$ bits of masking, we still have 33 bits of precision that we can freely use throughout the computation. Since our benchmarks are performed on a regular x86_64 CPU, 128-bit floating point arithmetic is emulated using GCC's quadmath library, however additional speed-ups could be achieved on more recent hardware that natively supports these operations (e.g. IBM's next POWER9 processor). In our proof of concept, our main focus was to improve the running time, the floating point precision, and the communication complexity of the online phase, so we implemented the offline phase only for the trusted dealer scenario, leaving the honest but curious dealer variant as a future work.

We present below a model-training method that leverages the IRLS method. The method is first described below for a plaintext implementation. In the MPC instantiation, each player gets a secret share for each variables. Every product is evaluated using the bilinear formula of Section 2, and the sigmoid using the Fourier method of Section 4.

Model training method: Train(X,y)
Input: A dataset $X \in M_{N,k}(\mathbb{R})$ and a training vector $y \Sigma \{0, 1\}^N$
Output: The model $\theta \Sigma \mathbb{R}^k$ that minimizes $Cost_{x,y}(\theta)$
1: Precompute $Prods_i = X_i^T X_i$ for $i \in [0, N-1]$
2: $\theta \leftarrow [0, \ldots, 0] \in \mathbb{R}^k$
3: for iter=1 to IRLS_ITERS do //In practice IRLS_ITERS=8
4: $a \leftarrow X \cdot \theta$
5: $p \leftarrow [sigmo(a_0), \ldots, sigmo(a_{N-1})]$
6: $pmp \leftarrow [p_0(1-p_0), \ldots, p_{N-1}(1-p_{N-1})]$
7: $grad \leftarrow X^T(p-y)$
8: $H \leftarrow pmp \cdot Prods$
9: $\theta = \theta - H^{-1} \cdot grad$
10: end for
11: return $\theta$ We implemented the logistic regression model training described in this method. Each iteration of the main loop evaluates the gradient (grad) and the Hessian (H) of the cost function at the current position $\theta$, and solves the Hessian system (line 7) to find the next position. Most of the computation steps are bilinear on large matrices or vectors, and each of them is evaluated via a Beaver triplet (numerical masking data) in a single round of communication. In step 5, the sigmoid functions are approximated (in parallel) by an odd trigonometric polynomial of degree 23, which provides 20 bits of precision on the whole interval. We therefore use a vector of Fourier numerical masking data, as described in Section 4. The Hessian system (step 9) is masked by two (uniformly random) orthonormal matrices on the left and the right, and revealed, so the resolution can be done in plaintext. Although this method reveals the norm of the gradient (which is predictable anyway), it hides its direction entirely, which is enough to ensure that the final model remains private. Finally, since the input data is not necessarily feature-scaled, it is recommended to start from the zero position (step 2) and not a random position, because the first one is guaranteed to be in the IRLS convergence domain.

To build the MPC evaluation of the method, we wrote a small compiler to preprocess this high level listing, unroll all for loops, and turn it into a sequence of instructions on immutable variables (which are read-only once they are affected). More importantly, the compiler associates a single additive mask $\lambda_U$ to each of these immutable variables U. This solves two important problems that we saw in the previous sections: first, the masking information for huge matrices that are re-used throughout the method are transmitted only once during the whole protocol (this optimization already appears in [25], and in our case, it has a huge impact for the constant input matrix, and their precomputed products, which are re-used in all IRLS iterations). It also mitigates the attack that would retrieve information by averaging its masked distribution, because an attacker never gets two samples of the same distribution. This justifies the choice of 40 bits of security for masking.

During the offline phase, the trusted dealer generates one random mask value for each immutable variable, and secret shares these masks. For all matrix-vector or matrix-matrix products between any two immutable variables U and V (coming from lines 1, 4, 6, 7 and 8 of the model-training method, above), the trusted dealer also generates a specific multiplication triplet using the masks $\lambda_U$ of U and $\lambda_V$ of V. More precisely, it generates and distributes additive shares for $\lambda_U \cdot \lambda_V$ as well as integer vectors/matrices of the same dimensions as the product for the share-reduction phase. These integer coefficients are taken modulo 256 for efficiency reasons.

6.2 Results

We implemented all the described methods and we tested our code for two and three parties, using cloud instances on both the AWS and the Azure platforms, having Xeon E5-2666 v3 processors. In our application, each instance communicates via its public IP address. Furthermore, we use the zeroMQ library to handle low-level communications between the players (peer-to-peer, broadcast, central nodes etc. . . . ).

FIG. 5 illustrates a table of results of our implementation summarizing the different measures we obtained during our experiments for n=3 players. We considered datasets containing from 10000 to 1500000 points having 8, 12 or 20 features each. In the results that are provided, we fixed the number of IRLS iterations to 8, which is enough to reach a perfect convergence for most datasets, and we experimentally verified that the MPC computation outputs the same model as the one with plaintext iterations. We see that for the datasets of 150000 points, the total running time of the online phase ranges from 1 to 5 minutes. This running time is mostly due to the use of emulated quadfloat arithmetic, and this MPC computation is no more than 20 times slower than the plaintext logistic regression on the same datasets, if we implement it using the same 128-bit floats (yet, of course, the native double-precision version is much faster). More interestingly, we see that the overall size of the totality of the numerical masking data and the amount of online communications are small: for instance, a logistic regression on 150000 points with 8 features requires only 756 MB of numerical masking data per player, and out of it, only 205 MB of data are broadcasted during the online phase per player. This is due to the fact that Fourier numerical masking data is much larger than the value that is masked and exchanged. Because of this, the communication time is insignificant compared to the whole running time, even with regular WAN bandwidth.

Finally, when the input data is guaranteed to be feature-scaled, we can improve the whole time, memory and communication complexities by about 30% by performing 3 classical gradient descent iterations followed by 5 IRLS iterations instead of 8 IRLS iterations. We tested this optimization for both the plaintext and the MPC version and we show the evolution of the cost function, during the logistic regression, and of the F-score, depending on the method used.

FIG. 6 shows the evolution of the cost function during the logistic regression as a function of the number of iterations, on a test dataset of 150000 samples, with 8 features and an acceptance rate of 0.5%. In yellow is the standard gradient descent with optimal learning rate, in red, the gradient descent using the piecewise linear approximation of the sigmoid function (as in [25]), and in green, our MPC model (based on the IRLS method). The MPC IRLS method (as well as the plaintext IRLS) method converge in less than 8 iterations, against 500 iterations for the standard gradient method. As expected, the approx method does not reach the minimal cost.

FIG. 7 shows the evolution of the F-score during the same logistic regression as a function of the number of iterations. The standard gradient descent and our MPC produce the same model, with a limit F-score of 0.64. However, no positive samples are detected by the piecewise linear approximation, leading to a null F-score. However, in the three cases, the accuracy (purple) is nearly 100% from the first iteration.

We have tested our platform on datasets that were provided by the banking industry. For privacy reasons, these datasets cannot be revealed. However, the behaviour described in this paper can be reproduced by generating random data sets, for instance, with Gaussian distribution, setting the acceptance threshold to 0.5%, and adding some noise by randomly swapping a few labels.

Open problems. A first important open question is the indistinguishability of the distributions after our noise reduction method. On a more fundamental level, one would like to find a method of masking using the basis of half-range Chebyshev polynomials defined in the appendix as opposed to the standard Fourier basis. Such a method, together with the exponential approximation, would allow us to evaluate (in MPC) any function in $L^2$ ([−1, 1]).

7 References

1. M. Abadi, A. Chu, I. Goodfellow, H. Brendan McMahan, I. Mironov, K. Talwar, and L. Zhang. Deep learning with differential privacy. CoRR, abs/1607.00133, 2016.
2. Y. Aono, T. Hayashi, L. Trieu Phong, and L. Wang. Privacy-preserving logistic regression with distributed data sources via homomorphic encryption. IEICE Transactions, 99-D(8):2079-2089, 2016.
3. T. Araki, J. Furukawa, Y. Lindell, A. Nof, and K. Ohara. High-throughput semihonest secure three-party computation with an honest majority. In Proceedings of the 2016 ACM SIGSAC Conference on Computer and Communications Security, Vienna, Austria, Oct. 24-28, 2016, pages 805-817, 2016.
4. D. Beaver. Efficient Multiparty Protocols Using Circuit Randomization. In CRYPTO '91, volume 576 of Lecture Notes in Computer Science, pages 420-432. Springer, 1992.
5. A. Björck. Numerical Methods for Least Squares Problems. Siam Philadelphia, 1996.
6. D. Bogdanov, S. Laur, and J. Willemson. Sharemind: A framework for fast privacy preserving computations. In ESORICS 2008, pages 192-206. Springer, 2008.
7. J. Boyd. A comparison of numerical algorithms for Fourier extension of the first, second, and third kinds. J. Comput. Phys., 178(1):118-160, May 2002.
8. J. Boyd. Fourier embedded domain methods: Extending a function defined on an irregular region to a rectangle so that the extension is spatially periodic and $c^\infty$. Appl. Math. Comput., 161(2):591-597, February 2005.
9. J. Boyd. Asymptotic fourier coefficients for a C infinity bell (smoothed-"top-hat") & the fourier extension problem. J. Sci. Comput., 29(1):1-24, 2006.
10. K. Chaudhuri and C. Monteleoni. Privacy-preserving logistic regression. In Daphne Koller, Dale Schuurmans, Yoshua Bengio, and Léon Bottou, editors, Advances in Neural Information Processing Systems 21, Proceedings of the Twenty-Second Annual Conference on Neural Information Processing Systems, Vancouver, British Columbia, Canada, Dec. 8-11, 2008, pages 289-296. Curran Associates, Inc., 2008.
11. R. Cramer, I. Damård, and J. B. Nielsen. Secure Multiparty Computation and Secret Sharing. Cambridge University Press, 2015.
12. I. Damård, V. Pastro, N. Smart, and S. Zakarias. Multiparty computation from somewhat homomorphic encryption. In Reihaneh Safavi-Naini and Ran Canetti, editors, Advances in Cryptology CRYPTO 2012 32nd Annual Cryptology Conference, Santa Barbara, Calif., USA, Aug. 19-23, 2012. Proceedings, volume 7417 of Lecture Notes in Computer Science, pages 643-662. Springer, 2012.
13. I. Damård, V. Pastro, N. P. Smart, and S. Zakarias. SPDZ Software. www.cs.bris.ac.uk/Research/CryptographySecurity/SPDZ/14.
14. Dataset. Arcene Data Set. archive.ics.uci.edu/ml/datasets/Arcene.
15. Dataset. MNIST Database. yann.lecun.com/exdb/mnist/.
16. C. Fefferman. Interpolation and extrapolation of smooth functions by linear operators. Rev. Mat. Iberoamericana, 21(1):313-348, 2005.
17. A. Gascón, P. Schoppmann, B. Balle, M. Raykova, J. Doerner, S. Zahur, and D. Evans. Privacy-preserving distributed linear regression on high-dimensional data. Proceedings on Privacy Enhancing Technologies, 4:248-267, 2017.
18. R. Gilad-Bachrach, N. Dowlin, K. Laine, K. E. Lauter, M. Naehrig, and J. Wernsing. Cryptonets: Applying neural networks to encrypted data with high throughput and accuracy. In Proceedings of the 33nd International Conference on Machine Learning, ICML 2016, New York City, N.Y., USA, Jun. 19-24, 2016, pages 201-210, 2016.
19. I. Goodfellow, Y. Bengio, and A. Courville. Deep Learning. MIT Press, 2016. www.deeplearningbook.org.
20. M. R. Hestenes. Extension of the range of a differentiable function. Duke Math. J., 8:183-192, 1941.
21. D. Huybrechs. On the fourier extension of nonperiodic functions. SIAM J. Numerical Analysis, 47(6):4326-4355, 2010.
22. A. Jäschke and F. Armknecht. Accelerating homomorphic computations on rational numbers. In ACNS 2016, volume 9696 of LNCS, pages 405-423. Springer, 2016.
23. Y. Lindell and B. Pinkas. Privacy preserving data mining. In Advances in Cryptology CRYPTO 2000, 20th Annual International Cryptology Conference, Santa Barbara, Calif., USA, Aug. 20-24, 2000, Proceedings, pages 36-54, 2000.
24. R. Livni, S. Shalev-Shwartz, and O. Shamir. On the computational efficiency of training neural networks. In Zoubin Ghahramani, Max Welling, Corinna Cortes, Neil D. Lawrence, and Kilian Q. Weinberger, editors, Advances in Neural Information Processing Systems 27: Annual Conference on Neural Information Processing Systems 2014, Dec. 8-13, 2014, Montreal, Quebec, Canada, pages 855-863, 2014.
25. P. Mohassel and Y. Zhang. SecureML: A system for scalable privacy-preserving machine learning. In 2017 IEEE Symposium on Security and Privacy, S P 2017, San Jose, Calif., USA, May 22-26, 2017, pages 19-38. IEEE Computer Society, 2017.
26. V. Nikolaenko, U. Weinsberg, S. Ioannidis, M. Joye, D. Boneh, and N. Taft. Privacy-preserving ridge regression on hundreds of millions of records. In 2013 IEEE Symposium on Security and Privacy, S P 2013, Berkeley, Calif., USA, May 19-22, 2013, pages 334-348. IEEE Computer Society, 2013.
27. L. Trieu Phong, Y. Aono, T. Hayashi, L. Wang, and S. Moriai. Privacy-preserving deep learning: Revisited and enhanced. In Lynn Batten, Dong Seong Kim, Xuyun Zhang, and Gang Li, editors, Applications and Techniques in Information Security—8th International Conference, ATIS 2017, Auckland, New Zealand, Jul. 6-7, 2017, Proceedings, volume 719 of Communications in Computer and Information Science, pages 100-110. Springer, 2017.
28. H. Whitney. Analytic extensions of differentiable functions defined in closed sets. Trans. Amer. Math. Soc., 36(1):63-89, 1934.
29. S. Wu, T. Teruya, J. Kawamoto, J. Sakuma, and H. Kikuchi. Privacy-preservation for stochastic gradient descent application to secure logistic regression. The 27th Annual Conference of the Japanese Society for Artificial Intelligence, 27:1-4, 2013.

II. HIGH-PRECISION PRIVACY-PRESERVING EVALUATION OF REAL-VALUED FUNCTIONS VIA FOURIER AND POLYNOMIAL SPLINES

1 Overview

Polynomial and Fourier splines are pieceswise functions defined by either polynomials or Fourier series (trigonometric functions) that are helpful for approximating various functions in machine learning.

Disclosed is a method for high-precision privacy-preserving function evaluation of such splines based on a hybrid multi-party computation solution. The method combines Fourier series and polynomial evaluation via secret sharing methods with checking bounds via garbled circuits. The privacy-preserving high-precision evaluation of Fourier and polynomial functions in an interval using techniques disclosed above in section "I High-Precision Privacy-Preserving Real-Valued Function Evaluation" (see also [3]).

Finally, we present a new concept known as garbled automata via dualizing classical garbled circuits (where public functions are evaluating on secret inputs) into circuits where one evaluates secret functions on public inputs. This allows to speed up some of the evaluations in the garbled circuits setting, such as the comparison operator.

2 Using Garbled Circuits with Oblivious Transfer

We first recall the basic garbled circuit protocol with oblivious transfer together with various optimizations. Logic synthesis techniques are used to optimize the circuit and are delineated below. We then describe standard techniques for converting additive secret shares to garbled circuits secret shares, performing the check and then converting back to additive secret shares.

2.1 Background on Garbled Circuits

In general garbled circuits, the (public) function is described as a Boolean circuit consisting of AND and XOR gates. The basic version of the protocol described by Yao in "Protocols for Secure Computations", IEEE, 1982, consists of the following three phases: 1) garbling phase; 2) transfer phase; 3) evaluation phase. We now recall the description of each individual phase.

2.1.1 Garbling Phase

Each logical gate (AND or XOR) has two input wires (typically denoted by a and b) and an output wire (denoted by c). For w∈{a, b, c}, the garbler chooses labels $k_0^w$ and $k_1^w$ (in $\{0, 1\}^k$) corresponding to the two possible values. FIG. 8 illustrates an example truth table and a corresponding encrypted truth table (encryption table). One uses each row to symmetrically encrypt the corresponding label for the output wire using the two keys for the corresponding input wires. The garbler then randomly permutes the rows of the encryption table to obtain the garbled table which is sent to the evaluator (for each gate).

2.1.2 Transfer Phase

The garbler and the evaluator then have their private input bits denoted by $u_1 \ldots u_n$ and $v_1 \ldots v_n$, respectively. Here, each bit $u_i$ or $v_i$ has a private value in $\{0, 1\}$ that should not be revealed to the other party.

It is easy for the garbler to transmit the labels of its bits to the evaluator (simply send the corresponding labels $K^{u_1}, K^{u_2}, \ldots, K^{u_n}$). The evaluator needs to obtain its corresponding labels $K^{v_1}, K^{v_2}, \ldots, K^{v_n}$ without revealing to the garbler the the private values of these bits. This is done via 1-out-of-2 oblivious transfer—the evaluator asks for $K_b^w$ for each $w=v_1, \ldots, v_n$ where $b \in \{0, 1\}$ is the corresponding value. The OT guarantees that the garbler learns nothing about b and the evaluator learns nothing about $K_{1-b}^w$.

2.1.3 Evaluation Phase

In the evaluation phase, the evaluator, having received its keys $K^{v_1}, K^{v_2}, \ldots, K^{v_n}$ (via OT) and the keys $K^{u_1}, K^{u_2}, \ldots, K^{u_n}$ of the garbler, begins to evaluate the Boolean circuit sequentially. Assuming that for a given gate, the evaluator has already determined the labels for the input wires $K^a$ and $K^b$, the evaluator tries to decrypt with $K^a K^b$ the entries in the corresponding garbled table until a successful decryption of $K^c$—the label for the output wire.

2.2 Optimizations

2.2.1 Point-and-Permute

The evaluator can simply decrypt one row of the garbled table rather than all four. This is due to sorting the table based on a random select bit. See [8] for more details.

2.2.2 Free XOR

This optimization results in the amount of data transfer and the number of encryption and decryption depending only on the number of AND gates, not XOR gates. The technique is introduced in [7].

Remark 1.

The garbler chooses a global offset R (known only to the garbler), and valid throughout the whole circuit. The labels of the true and false logical value (equivalently of the two colors) XOR to R. It was observed in the FleXOR [5] that the scope of the "global" offset can be limited to wires that are connected by XOR gates. This divides the circuit into XOR-areas, and R must only be unique per XOR-area. If one works with non-Boolean circuits (e.g., the logical values of a wire are numbers modulo B instead of modulo 2), we just replace the offset⊕R with +x.R mod B.

2.2.3 Fixed-Key AES

This method enables garbling and evaluating AND gates by using fixed-key AES instead of more expensive cryptographic hash functions [2]. More precisely, $\text{Enc}_{A,B}(C)=H(A,B)\oplus C$ where $H(A,B)=\text{AES}(X)\oplus$ and $X=2AH\oplus 4B\oplus T\ 4B$ and T is a public tweak per gate (gate number).

2.2.4 Row Reduction

This optimization reduces the size of a garbled table from four rows to three rows. The label of the output wire is generated as a function of the input labels. The first row of the garbled table is generated so that it fully consists of Os and does not need to be sent. See [9] for more details.

2.2.5 Half-Gates

The half-gates method reduces the size of garbled table from 3 rows after Row Reduction to 2 rows. This optimization applies to AND gates.

FIG. 9 illustrates a table in which we give the garbling time, garbling size and the evaluation time for different garbling optimizations. Garbling and evaluation times are in number of hash (AES) per gate, and garbling size in number of 128-bit ciphertexts per gate. See [10] for more details.

2.2.6 Sequential Circuit Garbling

Sequential circuits are circuits with traditional gates, a global clock and shift registers. Logical values in a wire are not constant, but vary between clock ticks: we can represent them as a sequence of values. Since clock and shift registers do not involve any secret, MPC and FHE circuits can natively handle them.

From a memory perspective, circuits are more compact (the description is smaller), and only two consecutive time stamps need to be kept in memory at a given time during the evaluation (less memory). It does however NOT reduce the total running time, the OT transmissions, or the precomputed data size, compared to pure combinational circuits.

2.3 Garbled Circuits as Secret Sharing Schemes

Intuitively, after $P_1$ (the evaluator) decrypts the labels for the bits of the output of the function (represented as a Boolean circuit), if $P_1$ colludes with the garbler ($P_0$), $P_1$ can compute the output. Yet, if $P_0$ and $P_1$ do not collude, none of them learns anything about the output, yet the output is secret shared.

This simple observation can be formalized in the context of a garbled circuits protocol using both the free-XOR optimization [7] and the point-and-permute optimization [8]. Assume that $R \in \{0,1\}^k$ is a binary string with least significant bit 1. In this case, the keys corresponding to a given wire w are $K_0^w$ and $K_1^w = K_0^w \oplus R$ and the permutation bit for the wire w is the least significant bit of $K_0^w$.

For a private input x, the shared values are $$[\![ x ]\!]_{GC} := (K_0, K_0 \oplus xR).$$

The sharing protocols are described as follows:

$\text{Share}_0^{GC}(x)$: Here, $P_0$ (the garbler) holds a secret bit x. $P_0$ generates a random secret $K_0 \in \{0,1\}^k$ and sends $K_x = K_0 \oplus xR$ to $P_1$.

$\text{Share}_1^{GC}(x)$: Here, $P_1$ (the evaluator) holds a secret bit x. To do the secret sharing, the protocol can use Correlated OT [1]: $P_0$ (the sender) inputs a (correlation) function $f(z)=z\oplus R$ and receives $(K_0, K_1=K_0\oplus R)$. $P_1$ (the receiver), receives obliviously $K_x = x \oplus R$.

2.4 Conversion of Sharing Schemes

We recall basic conversion schemes between additive secret sharing and GC sharing. More details are summarized in [4, § III-IV].

For an input y, define $\text{Share}_0(y)$ as follows: the garbler samples $k_0 \in \{0,1\}^k$ and computes $k_x = K_0 \oplus yR$. The garbler then sends $k_x$ to the evaluator.

2.4.1 Additive Secret Sharing GC Sharing

Suppose that $x \in \mathbb{Z}/2^m\mathbb{Z}$ is additively secret shared inside the group, i.e., $[\![ x ]\!]_+ = (x_0, x_1)$. The conversion is standard and can be done by securely evaluating a Boolean addition circuit (see [6] for details). The GC secret shares are then defined as $[\![ x ]\!]_{GC} := [\![ x_0 ]\!]_{GC} + [\![ x_1 ]\!]_{GC}$ where $[\![ x_0 ]\!]_{GC} = \text{Share}_0^{GC}(x_0)$ and $[\![ x_1 ]\!]_{GC} = \text{Share}_1^{GC}(x_1)$.

2.4.2 GC Sharing Additive Secret Sharing

Suppose that $[\![ x ]\!]_{GC}$ is a GC secret shared value. One can convert to additive secret shares as follows: the garbler generates a random r and GC secret shares it, i.e., computes $\text{Share}_0(r)$. The two parties can then compute $[\![ x ]\!]_{GC} - [\![ r ]\!]_{GC} = [\![ d ]\!]_{GC}$. Then $P_1$ reconstructs d and the arithmetic shares are defined as $[\![ x ]\!]_+ = (r, d)$. For that, we need to call the reconstruction protocol $\text{Rec}_1([\![ d ]\!]_{GC})$.

Alternatively, it is suggested in [4, § IV.F] that one can convert by first going through Boolean secret shares and then converting Boolean to arithmetic.

3 Using Garbled Circuits Via a Trusted Dealer

We introduce a trusted dealer model where the trusted dealer (TD) is the garbler (i.e., the garbler also generates the numerical masking data for the secret sharing) and the computing parties are the evaluators.

In this case, computing the sign of y that is secret shared (among the different parties $P_1, \ldots, P_n$—the evaluators) can be viewed from the following perspective: the garbler $P_0$ generates a mask $\lambda$ for y (called conversion numerical masking data) that is secret shared among the parties. Once the masked value $x = y + \lambda$ is revealed among $P_1, \ldots, P_n$ (but x remains unknown to the garbler), each $P_i$, $i=1, \ldots, n$ can run a garbled circuits protocol with $P_0$ to check whether $x < \lambda$ (equivalent to whether $\text{sign}(y)=-1$).

Note that under this model, we need to replace the oblivious transfer protocol (typically run in the online phase of a garbled circuits protocol) by a secret sharing protocol in the offline phase. In practice, this means that we should exclude completely the garbler from the online phase.

4 Applications to the Sigmoid Function

We now show how to evaluate with high precision the unbounded sigmoid.

4.1 High-Precision Evaluation of the Sigmoid Function

Consider the sigmoid function sigmo $$(x) = \frac{1}{1+e^{-x}},$$

and suppose that we have a sufficiently good approximation of this function by Fourier series in a fixed bounded interval $[-B,B]$ (e.g. $[-10,10]$). Yet, the Fourier series need not approximate the function on the complement of this interval. In fact, they will likely diverge outside this interval, thus, causing a big loss in numerical accuracy of $\sigma(x)$ for x outside of $[-B, B]$.

To solve this problem, given a precision p, x and $\sigma(x)$, we would like to compute the actual sigmoid as follows: we first determine an interval $[-B, B]$ so that $\sigma(-B) \leq p$ and $\sigma(B) > 1 -$ p. For every x<−B we then return 0. Similarly, for every x>B we return 1. Otherwise, we return σ(x) computed by the Fourier approximation method. The Fourier-based evaluation is done via secret MPC with auxiliary masking data as described in [3]. The comparison operations are performed via garbled circuits.

The main idea is that, given the bound B, one defines a function $\sigma_{Four}(x)$ as a linear combination of harmonics that approximates uniformly the function σ(x) on the interval [−B,B]. Note that $\sigma_{Four}(x)$ can be MPC evaluated via the secret sharing protocol with Beaver numerical masking data presented in [3].

Outside of this interval, however, the two functions typically diverge quickly and as such, one cannot simply replace σ(x) by $\sigma_{Four}(x)$. Ideally, one wants to evaluate the function $$\tilde{\sigma} := \begin{cases} 0 & \text{if } x < -B \\ \sigma_{Four}(x) & \text{if } -B \leq x \leq -B \\ 1 & \text{if } x > B \end{cases}$$

on input x that is additively secret shared.

The idea is that if x is additively secret shared, we will use the conversion technique of Section 2.4 to convert it to GC secret shares. We will then evaluate a garbled Boolean circuit (presented in the next section) to obliviously detect the interval in which x lies (i.e., whether it is in (−∞,−B), [−B,B] or (B,+∞).

4.2 Boolean Comparison and Addition Circuits

Now that we know how to convert from additive secret shares to GC secret shares, we can already garble and evaluate the two comparisons. To do that, we need an explicit Boolean circuit for comparing two numbers of n bits each.

4.2.1 Comparison Circuit

FIG. 10 illustrates an example comparison circuit as follows:
Input: x known by the evaluator (possibly masked with a color only known to the garbler)
Input: λ known by the garbler
Output: x<λ (possibly masked with a color only known to the garbler)
Notice that in the illustrated circuit, one can potentially benefit from the half-gate technique.

4.2.2 Secret Addition Circuit

FIG. 11 illustrates and example secret addition circuit as follows:
Input: x known by the evaluator (possibly masked with a color only known to the garbler)
Input: λ known by the garbler
Output: x+λ (possibly masked with a color only known to the garbler)
Notice that in this case, one can potentially benefit from the half-gate technique as well.

5 Garbled Automata

Since we are combining garbled circuits with masking techniques, there is another point of view. In a regular garbled circuit, each wire has two possible logical states (their truth value 0,1) and gates encode transitions between these states.

5.1 Dualizing Garbled GC Secret Sharing

Here, we describe a dual point of view on the classical garbled circuits method that will be useful in the context of finite state automata.

5.1.1 Secret Operations on Revealed Values

FIG. 12 illustrates a diagram of two example functions. Assume that one has a public function F on two secret inputs x and y that produces a (secret) output z, i.e., z=F(x,y). For instance, F can be thought of as a Boolean gate in the classical garbled circuit sense and x and y can be thought of as private inputs. Assuming that x and y are secret shared between the garbler and the evaluator in the sense described in Section 2.3, an alternative way of thinking of the scheme is from the point of view of masking: the garbler has generated masks λ and μ for x and y, respectively, as well as a mask v for the output z=F(x,y). We are looking for a function G operating on the revealed values a and b such that $U_F$ makes the diagram commutative.

For example, in Beaver multiplication, F=x and $\text{mask}_\lambda$=+λ, so we easily determine that $$UF(a,b)=(a-\lambda)\times(b-\mu)+v. \quad (1)$$

As it can be seen, this function is only known to the garbler (who is the only party knowing the masks λ, μ and v. As such, it can be thought of as a secret function.

Here, we view the operation $\text{mask}_\lambda: \mathcal{D} \to \mathcal{R}$ as a (secret) bijection between two sets, $\mathcal{D}$ —the domain of the variable x and $\mathcal{R}$ —the set of masked/revealed values (Strictly speaking, the notation λ is not needed—all that is needed is simply a function mask associated to each wire.). We use $\text{unmask}_\lambda: \mathcal{R} \to \mathcal{D}$ to denote the inverse map. In terms of security, knowing $\text{mask}_\lambda(x)$ should not reveal information about either x, or the bijection mask λ.

Remark 2 Note that we do not require mask to be a uniformly random bijection between $\mathcal{D}$ and $\mathcal{R}$. This is, e.g., the case of statistical masking described in [3].

5.1.2 Labelling

For each possible masked value $a=\text{mask}_\lambda(x)$ one defines a label $X_a$ such that, given $X_a$, anyone can easily extract a, but given a, the evaluator cannot determine $X_a$.

5.1.3 Garbled Tables

The garbler creates the garbled table as follows: the rows of the table are $$\mathcal{T} = \{\mathcal{T}_{a,b} := Enc_{X_a X_b}(X_{U_F(a,b)})\},$$

where a, b are enumerated in the order of the corresponding revealed sets (which we call the natural order).

5.2 Garbled Automata Via the Dual Perspective

Figure 13:
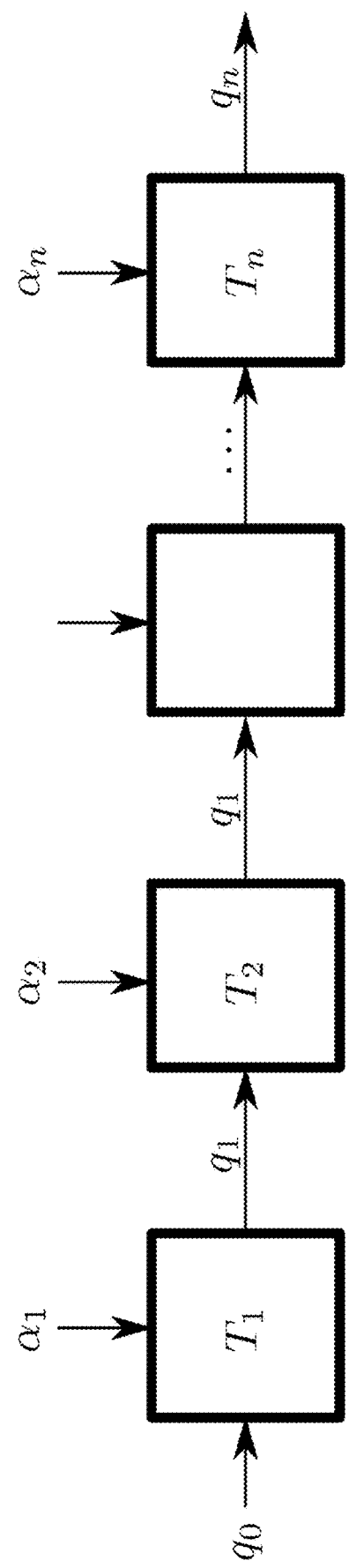
FIG. 13 illustrates a schematic of a state machine that processes n letters.

FIG. 13 illustrates a schematic of a state machine that processes n letters. The state machine can be described as follows:

At each iteration, the machine has a state $q_i \in Q_i$. The domain $Q_i$ is public, but $q_i$ is usually private (meaning, it is known by neither the garbler, nor the evaluator). Here, $q_0$ is the initial state: it can be either public or private depending on the function we want to evaluate.

At each iteration, the machine reads a letter $\alpha_1$ from an alphabet $\Sigma_i$. The alphabets $\Sigma_i$ are public and can be different for the different iterations. In our model, the letters are known to the evaluator but unknown to the garbler.

Between each iteration, states are connected by a deterministic transition function $T_i: \Sigma_i \times Q_{i-1} \to Q_i$. The function $U_i := U_{T_i}$ associated to $T_i$ via the diagram in FIG. 12 is only known to the garbler (who is the only one knowing the masking values $\lambda_{i-1}$ of $q_{i-1}$ and $\mu_i$ of $\alpha_i$. Yet, the domain of this function is public (e.g., the function $U_i$ could be the function in (1)).

5.2.1 Garbling Phase

For each state $Q_i$, the garbler chooses a mask $\lambda_i$ which we think of a permutation of $Q_i$, i.e., $\text{mask}_{\lambda_i}: Q_i \to \mathcal{R}_i$ (here, $\mathcal{R}_i$ denotes revealed values). We now have $\mathcal{R}_i=(r_{i,1}, \ldots, r_{i,j}, \ldots)$ and except for the garbler, the value $r_{i,j}$ does not reveal anything about the state $q_{i,j}$=unmask$_{\lambda_i}(r_{i,j})$.

Out of the masking mask$_{\lambda_i}$ and mask$_{\mu_i}$, the garbler can also define the garbled table $T_i$. We use $X_{i,j}$ to denote the label of $r_{i,j}$ and also ensure that one can deduce j (and hence, $r_{i,j}$) out of $X_{i,j}$ (for instance, the most significant bits of the label can be equal to j). The garbler also picks masking values mask$_{i,j}$ for all possible letters $\alpha_{i,j} \in \Sigma_i$, but this time without any privacy requirement on the ordering (the index j can publicly reveal the letter or even be equal to the letter).

For each iteration i, for each letter $\alpha \in \Sigma_i$, the garbler encrypts the transition functions $T_i : Q_{i-1} \times \Sigma_i \rightarrow Q_i$ consisting of a list of $|Q_{i-1}|$ ciphertexts. More precisely, the garbler computes the garbled table $\mathcal{T}_i$ defined as in Section 5.1.3 using the mask mask$_{\lambda_{i-1}}$ for $Q_{i-1}$ and mask$_{\nu_i}$ for $\Sigma_i$ as well as the private function $U_{T_i}$.

Row reduction: Labels can always be chosen so that the first ciphertext of each transition function (i.e. $C_i$, $\alpha$, 0) is always 0 and does not need to be transmitted.

5.2.2 Evaluation Phase

The evaluator has received (via OT or via masking) the labels $y_i$ for the n letters $\alpha_i$, and the initial label $x_0$ of the initial state (thus, it deduces its color $j_0$). For i=1 to n, it decrypts $x_i = Dec_{x_{i-1}, y_i}(\mathcal{T}_i, \alpha_i, j_{i-1})$ and deduces the next label $j_i$.

The label of the last state is the result of the circuit. Depending whether the result should be private, masked or public, the mapping unmask can be provided by the garbler.

5.3 Examples

We now show some examples in which the point of view of the automata might be helpful and where, thinking of more general automata, actually helps speed up some protocols.

5.3.1 Example with the Bitwise Comparison Automata

Suppose we need to compute the sign of an additively shared 128-bit number x. The garbler chooses a mask $\lambda$ (during the online phase, $a = x + \lambda$ will be revealed). The question $x \le 0$ is equivalent to $a \le \lambda$, so the garbler encodes the "compare with lambda" automata as follows:

We denote by $q_i$ the result of the comparison of the i least significant bits of a and $\lambda$. (informally, (a mod $2^i$)$\le$($\lambda$ mod $2^i$)). By definition, we have Initial State: $q_0 := 1$
Transition: $q_i := q_{i-1}$ if $a_i = \lambda_i$, $\lambda_i$ otherwise.
Output: $q_{128}$ is the answer to $a \le \lambda$.
$\Sigma_i = Q_i = \{0,1\}$ for all i.
Garbling phase: 128×2×2=512 encryptions, 128×3=384 ciphertexts (row reduction)
Evaluation phase: 128×1 decryptions The automata approach seems to include all known optimizations (half gates, point-and-permute).

5.3.2 Example with the Base 4 Comparison Automata

This is the same as the base 2 comparison automata above, except that we compare in base 4. States $Q_i$ still have a Boolean meaning, but the alphabet $\Sigma_i = 0, 1, 2, 3$. Again, we denote by $q_i$ the result of the comparison of the i least significant bits of a and $\lambda$. (informally, (a mod $2^i$)$\le$($\lambda$ mod $2^i$)). By definition, we have $q_0 := 1$
$q_i := q_{i-1}$ if $a_i = \lambda_i$, $(a_i \le \lambda_i)$ otherwise.
$q_{64}$ is the answer for $a \le \lambda$.
$\Sigma_i = \{0, 1, 2, 3\}\}$, $Q_i = \{0,1\}$ for all i.
Garbling phase: 64×4×2=512 encryptions, 64×7=448 ciphertexts (row reduction)
Evaluation phase: 64×1 decryptions The base-4 automata is even better than the traditional garbled circuit with all known optimizations (half gates, point-and-permute).

5.3.3 Example with Secret Integer Addition

We take as input a (public or masked) integer $(a_0, \ldots, a_n)$ are the digits (let's say in base B) in little endian order. We want to compute $a + \lambda$ where $\lambda$ is only known to the garbler. In this case, we will use an automata to compute the carry bits, and classical free-xor techniques to xor the carry with the input and get the final result:

$q_0 := 0$
$q_i := \lfloor (q_{i-1} + a_i + \lambda_i)/B \rfloor$.
$\Sigma_i = \{0, 1, 2, 3, \ldots, B-1\}$, $Q_i = \{0, 1\}$ for all i.
$res_i = q_i + \lambda_i + a_i$ mod B (use free-xor mod B)

REFERENCES

1. G. Asharov, Y. Lindell, T. Schneider, and M. Zohner. More efficient oblivious transfer and extensions for faster secure computation. In Ahmad-Reza Sadeghi, Virgil D. Gligor, and Moti Yung, editors, 2013 ACM SIGSAC Conference on Computer and Communications Security, CCS'13, Berlin, Germany, Nov. 4-8, 2013, pages 535-548. ACM, 2013.
2. M. Bellare, V. Hoang, S. Keelveedhi, and P. Rogaway. Efficient garbling from a fixed-key blockcipher. In 2013 IEEE Symposium on Security and Privacy, S P 2013, Berkeley, Calif., USA, May 19-22, 2013, pages 478-492. IEEE Computer Society, 2013.
3. C. Boura, I. Chillotti, N. Gama, D. Jetchev, S. Peceny, and A. Petric. High-precision privacy-preserving real-valued function evaluation. Cryptology ePrint Archive, Report 2017/1234, 2017. eprint.iacr.org/2017/1234.
4. D. Demmler, T. Schneider, and M. Zohner. ABY—A framework for efficient mixed-protocol secure two-party computation. In 22nd Annual Network and Distributed System Security Symposium, NDSS 2015, San Diego, Calif., USA, Feb. 8-11, 2015. The Internet Society, 2015.
5. V. Kolesnikov, P. Mohassel, and M. Rosulek. Flexor: Flexible garbling for XOR gates that beats free-xor. In J. Garay and R. Gennaro, editors, Advances in Cryptology—CRYPTO 2014-34th Annual Cryptology Conference, Santa Barbara, Calif., USA, Aug. 17-21, 2014, Proceedings, Part II, volume 8617 of Lecture Notes in Computer Science, pages 440-457. Springer, 2014.
6. V. Kolesnikov, A. Sadeghi, and T. Schneider. A systematic approach to practically efficient general two-party secure function evaluation protocols and their modular design. Journal of Computer Security, 21(2):283-315, 2013.
7. V. Kolesnikov and T. Schneider. Improved garbled circuit: Free XOR gates and applications. In Luca Aceto, Ivan Damård, Leslie Ann Goldberg, Magnús M. Halldórsson, Anna Ingólfsdóttir, and Igor Walukiewicz, editors, Automata, Languages and Programming, 35th International Colloquium, ICALP 2008, Reykjavik, Iceland, Jul. 7-11, 2008, Proceedings, Part II—Track B: Logic, Semantics, and Theory of Programming & Track C: Security and Cryptography Foundations, volume 5126 of Lecture Notes in Computer Science, pages 486-498. Springer, 2008.
8. D. Malkhi, N. Nisan, B. Pinkas, and Y. Sella. Fairplay—secure two-party computation system. In Matt Blaze, editor, Proceedings of the 13th USENIX Security Symposium, Aug. 9-13, 2004, San Diego, Calif., USA, pages 287-302. USENIX, 2004.

9. M. Naor, B. Pinkas, and R. Sumner. Privacy preserving auctions and mechanism design. In EC, pages 129-139, 1999.
10. S. Zahur, M. Rosulek, and D. Evans. Two halves make a whole—reducing data transfer in garbled circuits using half gates. In E. Oswald and M. Fischlin, editors, Advances in Cryptology—EUROCRYPT 2015-34th Annual International Conference on the Theory and Applications of Cryptographic Techniques, Sofia, Bulgaria, Apr. 26-30, 2015, Proceedings, Part II, volume 9057 of Lecture Notes in Computer Science, pages 220-250. Springer, 2015.

III. A METHOD FOR COMPILING PRIVACY-PRESERVING PROGRAMS

0 Overview

Disclosed is method for compiling privacy-preserving programs where a domain-specific programming language (DSL) allows a data analyst to write code for privacy-preserving computation for which the input data is stored on several private data sources. The privacy-preserving computing itself can be performed using the methods disclosed in section I above titled "High-Precision Privacy-Preserving Real-Valued Function Evaluation".

The DSL code can be compiled by a special-purpose compiler for multi-party computation into low-level virtual machine code that can be executed by multiple computing system nodes specific to distinct private data sources or parties.

The programming language can support functions and function calls, for loops with bounded number of iterations (known at compile time) as well as conditional statements with public condition. The language can support scoped variables. Finally, variables can be typed and types can have certain type statistical parameters deduced from user input or by the compiler.

Below, we provide a more detailed description of embodiments of both a DSL compiler as well as a special-purpose compiler.

1 DSL, Compile and Runtime Architecture

In one embodiment, the DSL code can include function definitions. One function definition can be an entry point (a void main( ) function without arguments). On the level of the DSL, the content of a function can be syntactically a tree of statements: block, public if-then-else, public bounded for, and other specific statements supported in MPC computing. Statements can have child statements, as well as other parameters. Certain statements are described below in accordance with one embodiment.

A block is a list of child statements which are evaluated sequentially, both in the offline evaluation, and in the online evaluation. For example:
{
 /* a sequence of child statements */
 . . .
}
A scoped variable is a variable declared in a statement, or at top level (global variable). A public if-then-else is parameterized by a scoped variable, and two child statements. During the offline phase, both children are evaluated from the same input binding, and during the online phase, only one of the children is evaluated, depending on the public value of the condition. A bounded for loop is parameterized by a scoped variable that iterates on a public integer range of N values, one child instruction, and a break condition. During the offline phase, the child instruction is repeated N times in a sequence. During the online phase, the child instruction is repeated, unless the break condition is publicly evaluated to true, in which case, the for loop terminates. If the break condition is absent, it is false by default. For example:
 for i in range (0,10) {
  /* sequence child instructions */
  breakif expression;
 }
An immutable corresponds to one particular occurrence of a scoped variable, at a certain point in time, in the offline execution. Each immutable gets a global sequential index. As such, the special-purpose compiler resolves scoped variable to immutables.

The compiler translates the DSL code into a tree of instructions and immutable declarations (a statement, e.g., a block, may contain more than one instruction or immutable declaration). This tree can then be converted into low-level virtual machine code that runs on each party computing system via the methods described in section I above titled "High-Precision Privacy-Preserving Real-Valued Function Evaluation".

There are two ways of evaluating the same program: the offline evaluation, which runs through each instruction at least once, and the online evaluation, which is a subset of the offline evaluation (see, e.g., "public if-then-else", below).

1.1 Offline Instruction Index

Each execution of an instruction during the offline evaluation gets a global sequential index, the instruction index. In the case of for loops and function calls, a syntactical instruction can have multiple offline indices. Most offline indices are executed sequentially during the online phase, except during if-then-else or for loops, where a conditional jump can occur.

1.2 Scoped Variables

The scope of the variable is the lifespan of the offline evaluation of the instruction in which the variable is defined. Each variable gets a global unique sequential index variableIdx, as it appears during the offline evaluation.
{
 /* variables are not accessible before their declaration */
 MPCReal x; /* declaration within a block */
 /* sequence of instructions */
 /* the scope of x is limited to this block */
}
In the above example, the scope of x is limited to the block displayed above. Thus, to describe the scope of a variable, we need to keep track of the block where it is declared.

1.3 Types

In the pseudocode, each variable must be declared before it is used, and the user has the option of specifying (partial) type information, for instance, if a variable is intended to contain a matrix, a vector or a number. Based on the information provided by the user, the compiler performs a full type deduction using a component known as statistical calculator. For function arguments or immediate declarations with their assignment, the user can provide just var or auto type, meaning that the compiler will do a full deduction. In addition, the compiler needs to use the deduced types to do function or operator to intrinsic resolution. Suppose, for example, that we have the following piece of code:

```
/* a, b have been defined previously, c is declared and it's
    type is deduced */
auto c=a+b;
...
```
The compiler needs to do type checking. This will be done after the abstract syntax tree (AST) has been built (during the time when variables are resolved to immutables and type checking has been done). At this stage, the compiler determines which operator "+" it needs to use based on the type of a and b, and deduced the full type of c.

1.4 Block IDs

In one embodiment, the only way in which one will be able to compile an MPC program is if one knows the maximum number of times each block will be executed (this information is needed for the offline phase). As such, each block statement can have a designated blockId.

1.5 Function Calls

Suppose that we have a function in MPC as follows;
```
def foo( ) {
    /* function code */
    MPCType x;
}
```
The challenge here is that at compile time, we do not know exactly how many times that function will be called and as such, we do not know how many times we should mask the value x (equivalently, how many different immutables should correspond to x). Since everything is unrolled, the compiler will be able to detect stack overflows at compile time. In one embodiment, functions and function calls are supported under the following constraints: the compiler can determine the maximum number of function calls; and the compiler is capable of unrolling the function.

1.6 Immutables

In one embodiment, each immutable gets a global sequential index—immutableIdx. An immutable has a parameterized type (MPCType) that is determined at compile time. Once initialized, the logical value of an immutable is constant. In one embodiment, an immutable is associated to at most one mask per masking type, and has therefore at most one masked value per masking type. The actual values (representations) of an immutable are lazily computed during the online evaluation, and are stored by each player in its own container. These vales can include, for example:

The public value (equal to the logical value), same for all players (if present, it takes precedence over all other representations);

A secret shared value (per secret sharing scheme), different for all players;

A masked value (per masking type), same for all players. For instance, the following excerpt of the DSL
```
/* x is an MPCType */
MPCType x;
x:=x+y;
x:=x*x;
```
should resolve to the following intermediate code involving immutables
```
/* x is an MPCType */
MPCType x1;
x2:=x1+y;
x3:=x2*x2;
```
where x1, x2, x3 are immutables all corresponding to the MPC variable x.

1.7 Public if-then-Else

The general public if-then-else conditional statement is the following construct:
```
if (/* public condition */) then {
    /* add your code here */
```
```
} else {
    /* add your code here */
}
```
As an example, consider the following source code excerpt:
```
/* x, y have been declared as a secret shared MPC type */
if (/* public condition */) then {
    x:=2*x;
} else {
    x:=x+y;
    x:=2*x;
}
z: x*x;
```
Here, we have the MPC variable x which will be internally represented by a collection of immutables. In fact, the compiler could translate the above statement into the following code replacing the scoped variable x with multiple immutables in the following manner:
```
/* xi, yi are the immutables corresponding to x and y
/* Note that x5 is an auxiliary immutable with the
    maximum of the parameters for x2 and x4.
*/
if (/* public condition */) then {
    x2:=2*x1;
    x5:=x2;
} else {
    x3:=x1+y1;
    x4:=2*x3;
    x5:=x4;
}
```
Here, x5 serves to synchronize the two blocks. We have replaced each occurrence of x with a different immutable. At each stage, x is associated with an occurrence of some immutable. Since each immutable is a parameterized MPCType, each xi will have specific parameters and masking data. Since x is local for neither the if, nor the then block, the immutables x2 and x4 need to be synchronized after the conditional block. This requires the compiler to create an extra auxiliary immutable x5 corresponding to x to which it will copy the result of either of the blocks.

In all cases, the value of the Boolean condition will be publicly revealed during the online phase, but from the compiler's point of view, two cases may occur during unrolling.

The condition is an immediate Boolean known by the compiler: in this case, the compiler generates either the then block, or the else block depending on the computed Boolean value.

The condition depends on data that is not known at compile time. In this case, the compiler generates the code for both then and else block and synchronizes the immutable indexes between both blocks. During the online phase, the Boolean condition value is publicly revealed and the execution jumps either to the then or the else start. The compiler reveals only the Boolean value of the condition, not the intermediate steps to compute this Boolean: for instance, it the condition is y<3, the comparison is evaluated in a privacy-preserving manner (y remains secret). If the value of y is not sensible, the user can gain performance by writing reveal(y)<3, which publicly reveals the value of y and then performs a public comparison.

In one embodiment, the public condition cannot include side-effects, as its code of breakif is completely omitted if the compiler resolves the condition to an immediate. For example,
```
boolean weirdos(auto& x) {
    x=x+1;
    return true;
```

}
...
```
if (weirdos(x)) {
    /* instructions */
}
```
1.8 Public Bounded for Loops
In one embodiment, a public bounded MPC for loop is the following construct:
```
for (i in range (0,10)) {
    /* your code here */
    breakif condition; // optional public break condition, in
        the end
}
```
In one embodiment, the breakif condition cannot include side-effects, as the code of break-if is completely omitted if the compiler resolves the condition to an immediate. For example,
```
boolean weirdos(auto& x) {
    x=x+1
    return false;
}
...
For (i in range (0,5)) {
    breakif weirdos(x);
}
```
Again, the compiler generates the code for all executions in sequence, and tries to evaluate the breakif condition at all iterations. If one of the conditions is an immediate true, then a warning is issued saying that the for loop always breaks after the current iteration. If all conditions are immediate false (or if the breakif is absent), then the code of all blocks is generated in sequence. Else, the compiler generates the code for all accessible iterations and synchronizes each variable after each non-immediate condition. Just as in the case of public if-then-else constructs, here we also need to synchronize the variables according to how many times we have looped.

2 DSL, Intermediate and Machine Languages

Figure 14:
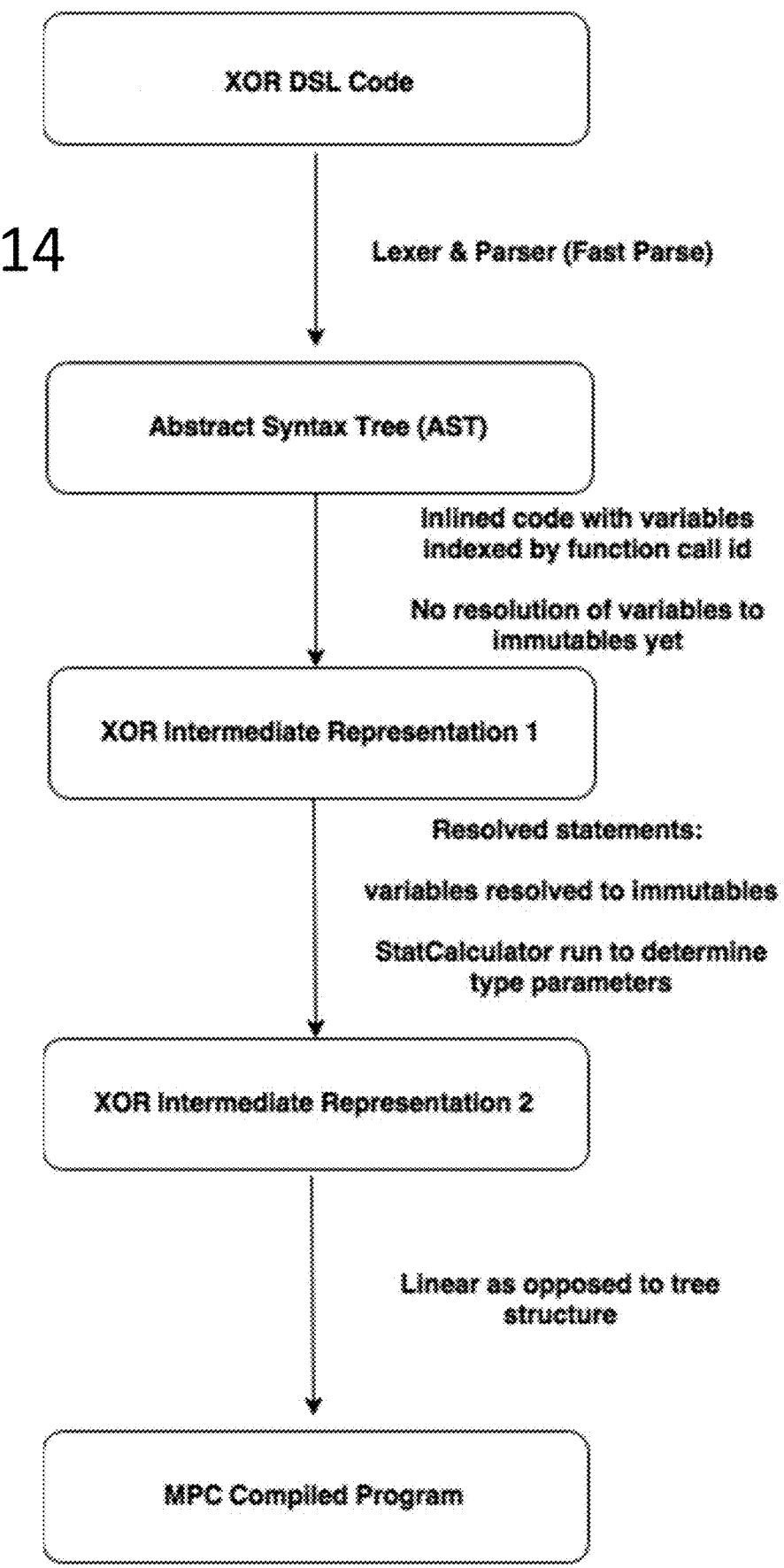
FIG. 14 illustrates a method for performing a compilation in accordance with one embodiment.

FIG. 14 illustrates a method for performing a compilation in accordance with one embodiment. In order to perform the compilation process, the compiler first converts the DSL code into an intermediate representations performing various type checkings, substituting variables with immutables as well as resolving bounded for loops, public if-then-else, functions and function calls. There are two immediate representations: Immediate Representation 1 (IR1) and Immediate Representation 2 (IR2). The abstract syntax tree (AST) is converted into IR1 by performing the first stage of the semantic analysis and type checking; yet, no variables are resolved to immutables at this stage. Here, partial types are determined, but full types are not yet verified (statistical type parameters are not yet computed at this stage). The representation IR1 is then translated into IR2 by replacing variables with immutables, unrolling and synchronizing for loops, synchronizing if-then-else statements, unrolling function calls and most importantly, determining the full types by computing the statistical type parameters. The latter is achieved via user input parameters and/or the compiler's statistical calculator.

2.1 DSL Grammar Definition
The DSL grammar will include statements (these include blocks, if-then-else, bounded for, function bodies, assignments, etc.) as well as expressions. Unlike statements, expressions can be evaluated. Expressions include special ones, arithmetic expressions.

2.2 Intermediate Representation 1 (IR1)
The Intermediate Representation 1 (IR1) is the intermediate language that is a result of partial semantic analysis of the DSL. The idea is that the semantic analysis is done in two phases: one before variable resolution and type parameter calculation (Semantic Phase 1; or SP1) and another one where variables are replaced by immutables, full types are determined by deducing the type parameters (Semantic Phase 2; or SP2). The main reason for separating the two phases is that IR1 (the result of SP1) will be serializable and as such, one can define precompiled libraries in IR1. Anything beyond IR2 depends on the statistics of the input data and as such, cannot be precompiled (hence, the reason we separate the semantic analysis into SP1 and SP2).

The language IR1 has its own abstract syntax tree (AST-IR1). At this point, variables are not yet replaced by immutables; yet, IR1 achieves the following compiler properties and compiler checks:

Expressions are replaced by a sequence of standard operators:
```
res=a+b*c;
/* replaced by */
tmp=b*c;
res=a+tmp;
/* or */
res=foo(u+v*t, bar(w))
/* replaced by */
t1=v*t;
t2=u+t1;
t3=bar(w);
res=foo(t2, t3);
```
Undeclared variables are reported at this time
Non-void functions with no returns or vice versa
```
MPCReal foo(MPCReal u, MPCReal v) {
    MPCReal r=u+v;
}
```
Partial type check errors are reported—e.g.:
```
MPCReal r;
MPCMatrix M;
MPCReal res=r+M;
```
Resolving breakif statements in bounded for loops:
```
s=0;
for i in range(0, 10) {
    s=s+i;
    breakif(s>=10);
}
```
Alternatively, one can reserve the latter for SP2 after we have already determined the full type. One focuses on operational-level nodes (e.g., assignments and returns are partially resolved) and does partial resolution of the variables names; yet, one keeps function definitions and function calls as is.

2.3 Intermediate Representation 2 (IR2)
The Intermediate Representation 2 (IR2) is a compiled and unrolled program, almost in bijection with the final compiled program. In this representation, all loops and function calls are unrolled, immediate constants are propagated throughout the execution and all variables are fully resolved as immutables whose types are fully qualified. The same holds for triplets and masking data. As a consequence, there is no function definition node anymore, and all function calls are expanded as a single tree (function calls are not leafs any more, but internal nodes). Possible errors reported to the user are:

Recursion errors are detected and reported at this step (stack overflow)

Type errors (or impossibility to find relevant parameters).

In terms of the auxiliary numerical masking data (triplets) used in the offline phase of the privacy-preserving compute protocol, this representation includes:
  A global index of the auxiliary data
  A fully qualified MPC type.
Immutables are also fully qualified, including:
  A global index of immutables
  A fully qualified MPC type (including statistical type parameters).

3 Compilation Phases

In one embodiment, the method of compilation has the following phases:
  Lexical analysis
  Syntax analysis/Parsing=>AST generation
  Semantic analysis phase 1 (SP1) AST=>IR1
  Semantic analysis phase 2 (SP2) IR1=>IR2
We describe in more detail each of these phases below.

3.1 Lexical Analysis and Parsing Phases

These phases are fairly standard and independent of the privacy-preserving method used. The lexical analyzer scans the source code and produces the lexemes (tokens). These are then passed to the parser to create the abstract syntax tree (AST) using a precise description of the rules for the DSL grammar. Categories of tokens can include, for example: identifiers, keywords, literals, operators, delimiters.

3.2 Semantic Phase 1 (SP1)

This semantic analysis phase is very specific to the method of privacy-preserving computing.

3.2.1 Depth-First Search Traversal Method

The main method for SP1 performs a depth-first search (DFS) on the graph AST. The idea is that by DFS traversing AST one can determine the AST-IR1 nodes and populate the node contexts (see next section for the definition of those) for each of these nodes. This approach allows to detect undeclared variables or incompatible partial types, or to detect whether non-void functions return incompatible types.

3.2.2 Flattening Arithmetic Expressions

During the DFS traversal method, one also needs to flatten arithmetic expressions (the latter taken in the sense of the the DSL grammar). For example:
  res=u+foo(v*w);
has to resolve to
  tmp1=v*w;
  tmp2=foo(tmp1);
  res=u+tmp2;
Note that the advantage of the slots is that one does not need to introduce identifiers for all the auxiliary variables, but rather, one needs to only insert the root of the flattened expression in the appropriate slot. We thus consider a recursive procedure that takes as input an arithmetic expression (as a node of AST) and that outputs the flattened expression in a slot form.

3.2.3 Node Contexts (Temporary Symbol Table)

This symbol table is only temporary and is used to generate the AST-IR1. The representation of this temporary table is associating a context to each node (node context). This context contains all declarations and slots corresponding to a given node. Each node of the AST-IR1 graph will have a node context including all variable declarations for this node as well as the (partial) type of the variable. In order to check whether a variable is declared, we walk from that node to the root and check the environment of each node. It is the first occurrence of a declaration that takes priority. For example:

```
void main( ) {
  /* block corresponding to node1 */
  MPCReal r=1;
  /* u is declared already in this context */
  {
    /* block corresponding to node2 */
    MPCReal r=0;
    {
      /* block corresponding to node3 */
      r+=u;
    }
  }
}
```

In this example, the variable r is defined in the block of the main function (node1) and then is redefined in the child block (node2). There is then an assignment in the inner-most block (node3). During SP1, the compiler will first check the context of the parent of node3, that is node2, and it will then detect that there is a declaration and an assignment of r. The slot corresponding to this declaration/assignment will already appear in the node context of node2 (because of the depth-first search method used to traverse AST).

3.3 Semantic Phase 2 (SP2)

This semantic analysis phase is very specific to the method of privacy preserving computing.

3.3.1 Propagation of immediates

We keep the current index of all the immutables used so far in the method and perform this semantic phase in two passes:
First pass (AST depth-first search)
  Propagating immediates
  Unrolling functions
  Unrolling bounded for statements
  Unrolling public if-then-else statements
  Resolve variables with immutables (synchronizing if-then-else, bounded for and return statements)
Second pass
  Running stat calculator and determining full types of immutables

3.3.2 Resolved Statements

A resolved statement is a statement where function calls have been resolved (replaced by blocks), variables are replaced by immutables and variable bindings (maps from variables to immutables and backwards) have been populated. Resolved statements may be in a tree form whereas final compiled program is just a sequence of instructions.

3.3.3 Statistical Calculator

In addition, types have been checked and type parameters have been computed by a special component of the compiler called the statistical calculator. The main function of this component is to go sequentially through all the instructions and, assuming that the type parameters of the input variables for that instruction have been established, compute the type parameters for the output variables. Since the instructions of the virtual machine correspond to explicit mathematical functions, the compiler can compute the statistical distribution of the output and hence, deduce the full types (unless those are specified by the user).

4 Section Glossary

The following is a glossary of terms used in this section III. The descriptions here are provided only for the purpose of assisting the reader to understand the disclosed embodiments and are not restrictive on the claimed invention.
AST1: Abstract syntax tree produced directly from the DSL.

AST2: Abstract syntax tree derived from AST1 where arithmetic expressions are MPC-optimized (initially, we assume that AST1 and AST2 are the same).
AST-IR1: Abstract syntax tree corresponding to the Intermediate Language 1 (IL1)
block: A basic statement used to define a scope
expression: A grammar construct that can be evaluated
IR1: Intermediate Representation 1
IR2: Intermediate Representation 2
immutable: One assignment of a particular variable (Each variable can have a corresponding set of immutables.)
scoped variable: A variable visible to only a particular block (scope)
semantic phase 1 (SP1): Partial semantic analysis independent of type parameters and immutables
semantic phase 2 (SP2): Full semantic analysis resulting in a compiled privacy-preserving program
statement: A grammar construct (block, if-then-else, bounded for loop, function body, etc.) statistical calculator: Compiler component that passes through the instructions and deduce type parameters in SP2

VI. COMPUTER IMPLEMENTATION

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 15:
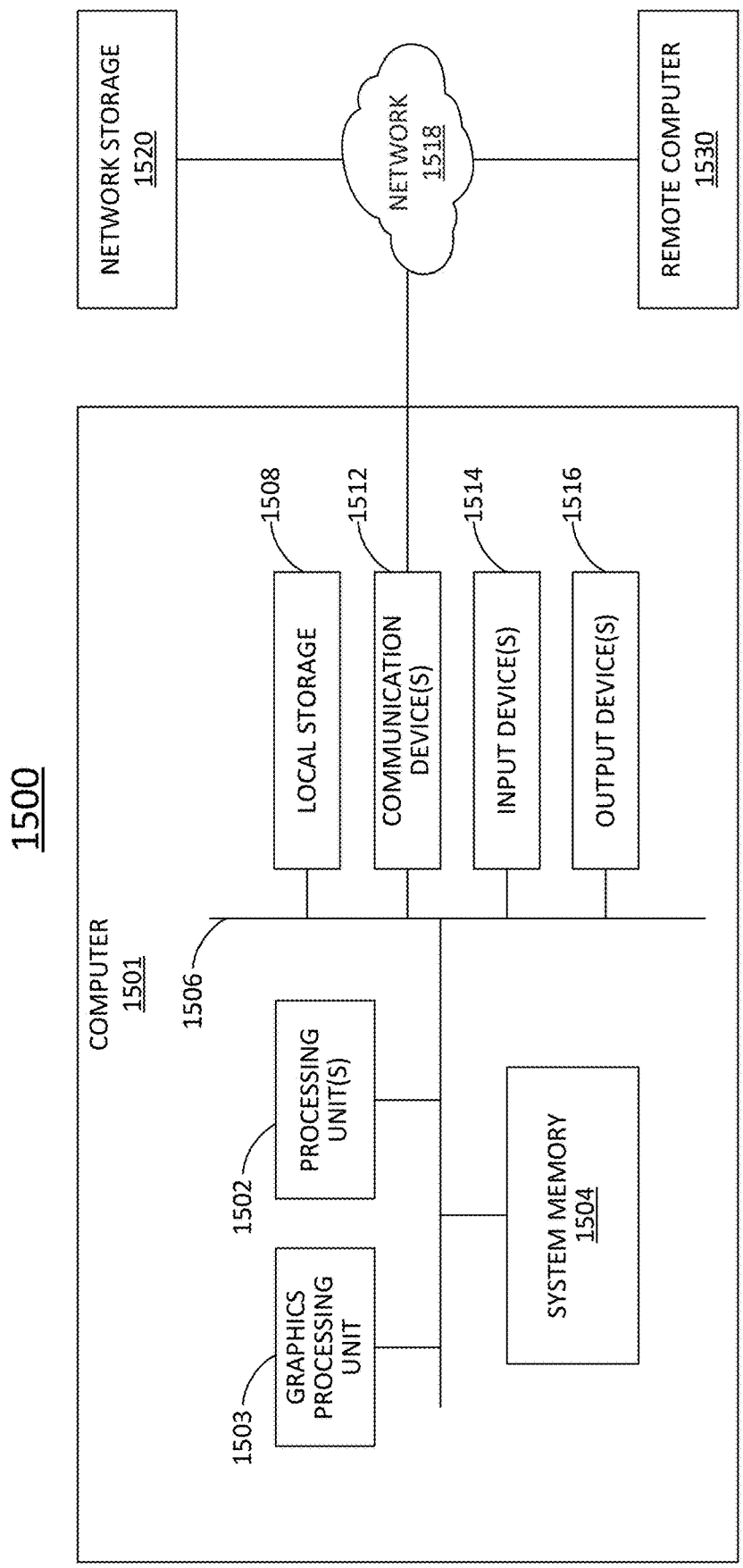
FIG. 15 illustrates a general computer architecture that can be appropriately configured to implement components disclosed in accordance with various embodiments.
Figure 16:
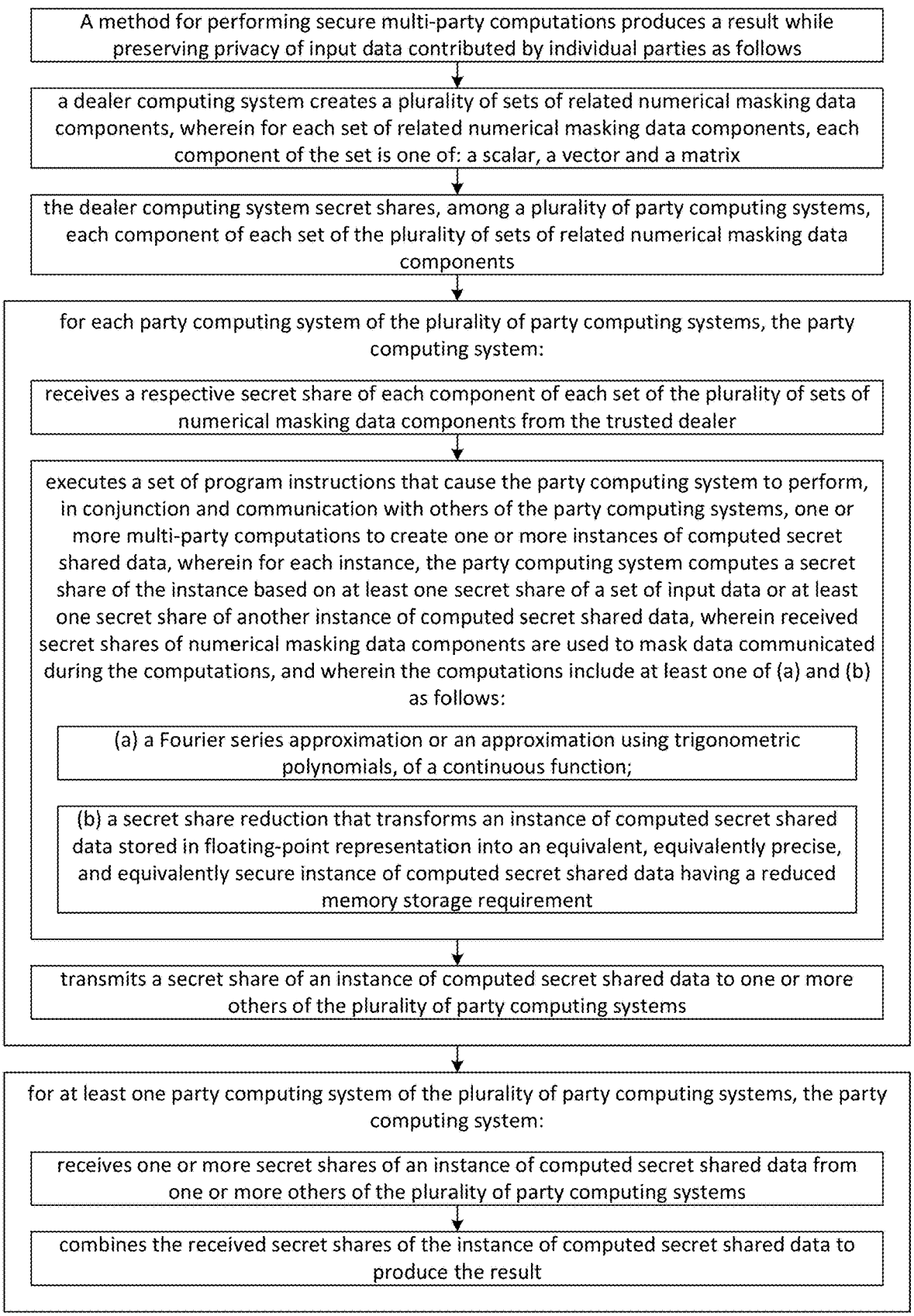
FIG. 16 illustrates a method for performing secure multi-party computations in accordance with various embodiments.

FIG. 15 illustrates a general computer architecture 1500 that can be appropriately configured to implement components disclosed in accordance with various embodiments. The computing architecture 1500 can include various common computing elements, such as a computer 1501, a network 1518, and one or more remote computers 1530. The embodiments disclosed herein, however, are not limited to implementation by the general computing architecture 1500.

Referring to FIG. 15, the computer 1501 can be any of a variety of general purpose computers such as, for example, a server, a desktop computer, a laptop computer, a tablet computer or a mobile computing device. The computer 1501 can include a processing unit 1502, a system memory 1504 and a system bus 1506.

The processing unit 1502 can be any of various commercially available computer processors that can include one or more processing cores, which can operate independently of each other. Additional co-processing units, such as a graphics processing unit 1503, also can be present in the computer.

The system memory 1504 can include volatile devices, such as dynamic random access memory (DRAM) or other random access memory devices. The system memory 1504 can also or alternatively include non-volatile devices, such as a read-only memory or flash memory.

The computer 1501 can include local non-volatile secondary storage 1508 such as a disk drive, solid state disk, or removable memory card. The local storage 1508 can include one or more removable and/or non-removable storage units. The local storage 1508 can be used to store an operating system that initiates and manages various applications that execute on the computer. The local storage 1508 can also be used to store special purpose software configured to implement the components of the embodiments disclosed herein and that can be executed as one or more applications under the operating system.

The computer 1501 can also include communication device(s) 1512 through which the computer communicates with other devices, such as one or more remote computers 1530, over wired and/or wireless computer networks 1518. Communications device(s) 1512 can include, for example, a network interface for communicating data over a wired computer network. The communication device(s) 1512 can include, for example, one or more radio transmitters for communications over Wi-Fi, Bluetooth, and/or mobile telephone networks.

The computer 1501 can also access network storage 1520 through the computer network 1518. The network storage can include, for example, a network attached storage device located on a local network, or cloud-based storage hosted at one or more remote data centers. The operating system and/or special purpose software can alternatively be stored in the network storage 1520.

The computer 1501 can have various input device(s) 1514 such as a keyboard, mouse, touchscreen, camera, microphone, accelerometer, thermometer, magnetometer, or any other sensor. Output device(s) 1516 such as a display, speakers, printer, eccentric rotating mass vibration motor can also be included.

The various storage 1508, communication device(s) 1512, output devices 1516 and input devices 1514 can be integrated within a housing of the computer, or can be connected through various input/output interface devices on the computer, in which case the reference numbers 1508, 1512, 1514 and 1516 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

V. CONCLUDING COMMENTS

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing; encryption of a thing shall include encryption of a portion of the thing. In the claims, any reference characters are used for convenience of description only, and do not indicate a particular order for performing a method.

The invention claimed is:

1. A method for performing secure multi-party computations to produce a result while preserving privacy of input data contributed by individual parties, the method comprising:
   a dealer computing system creating a plurality of sets of related numerical masking data components, wherein for each set of related numerical masking data components, each component of the set is one of: a scalar, a vector and a matrix;
   the dealer computing system secret sharing, among a plurality of party computing systems, each component of each set of the plurality of sets of related numerical masking data components;
   for each party computing system of the plurality of party computing systems, the party computing system:
      receiving a respective secret share of each component of each set of the plurality of sets of numerical masking data components from the dealer computing system, and for at least one set of input data, receiving a secret share of the set of input data;
   executing a set of program instructions that cause the party computing systems to perform one or more multi-party computations to create one or more instances of computed secret shared data, wherein for each instance, each party computing system computes a secret share of the instance based on at least one secret share of a set of input data or at least one secret share of another instance of computed secret shared data, wherein received secret shares of numerical masking data components are used to mask data communicated during the computations, and wherein the computations comprise:
      a secret share reduction that transforms an instance of computed secret shared data stored in floating-point representation into an equivalent, equivalently precise, and equivalently secure instance of computed secret shared data, wherein each secret share of the transformed instance has a reduced memory storage requirement, and wherein the transformation is performed by at least:
         each party computing system of the plurality of party computing systems:
            selecting a set of highest order digits of a secret share beyond a predetermined cutoff position; and
            retaining a set of lowest order digits of the secret share up to the cutoff position;
         determining a sum of values represented by the selected set of highest order digits across the plurality of party computing systems; and
         distributing the determined sum across the retained sets of lowest order digits of the secret shares of the plurality of party computing systems;
      for each party computing system of the plurality of party computing systems, the party computing system transmitting a secret share of an instance of computed secret shared data to one or more others of the plurality of party computing systems; and
      for at least one party computing system of the plurality of party computing systems, the party computing system:
         receiving one or more secret shares of an instance of computed secret shared data from one or more others of the plurality of party computing systems; and
         combining the received secret shares of the instance of computed secret shared data to produce the result.

2. The method of claim 1, wherein the computations further comprise:
   approximating a value of a continuous function using a Fourier series selected, based on the set of input data or the another instance of computed secret shared data, from a plurality of determined Fourier series, wherein each of the plurality of determined Fourier series is configured to approximate the continuous function on an associated subinterval of a domain of the continuous function.

3. The method of claim 2, further comprising:
   partitioning a portion of the domain of the continuous function into a plurality of subintervals; and
   for each subinterval of the plurality of subintervals:
      determining a Fourier series approximation of the function on the subinterval.

4. The method of claim 2, wherein the multi-party computations further comprise selecting the associated subinterval using at least one of garbled circuits and oblivious selection.

5. The method of claim 2, wherein the approximation is a uniform approximation of the continuous function.

6. The method of claim 2, wherein the continuous function is a machine learning activation function.

7. The method of claim 6, wherein the machine learning activation function is the sigmoid function.

8. The method of claim 6, wherein the machine learning activation function is the hyperbolic tangent function.

9. The method of claim 6, wherein the machine learning activation function is a rectifier activation function for a neural network.

10. The method of claim 2, wherein the continuous function is the sigmoid function.

11. The method of claim 1, wherein determining a sum of values represented by the selected set of highest order digits across the plurality of party computing systems comprises:
    determining a set of numerical masking data components that sum to zero;

distributing to each of the party computing systems one member of the determined set;

each party computing system receiving a respective member of the determined set;

each party computing system adding the received member to its selected set of highest order digits of its secret share to obtain a masked set of highest order digits; and summing the masked sets of highest order digits.

12. The method of claim 1, wherein the result is a set of coefficients of a logistic regression classification model.

13. The method of claim 1, wherein the method implements a logistic regression classifier, and wherein the result is a prediction of the logistic regression classifier based on the input data.

14. The method of claim 1, wherein the dealer computing system is a trusted dealer computing system, and wherein communications between the party computing systems are inaccessible to the trusted dealer computing system.

15. The method of claim 1, wherein the dealer computing system is an honest-but-curious dealer computing system, and wherein privacy of secret shared input data contributed by one or more of the party computing systems is preserved regardless of whether communications between the party computing systems can be accessed by the honest-but-curious dealer computing system.

16. The method of claim 1, further comprising:
for at least one set of input data, performing a statistical analysis on the set of input data to determine a set of input data statistics;
performing a pre-execution of a set of source code instructions using the set of input data statistics to generate statistical type parameters for each of one or more variable types; and
compiling the set of source code instructions based on the set of statistical type parameters to generate the set of program instructions.

17. The method of claim 16, wherein the pre-execution is performed subsequent to:
unrolling loops in the set of source code instructions having a determinable number of iterations; and
unrolling function calls in the set of source code instructions.

18. The method of claim 1, wherein at least one set of related numerical masking data components consists of three components having a relationship where one of the components is equal to a multiplicative product of a remaining two of the components.

19. The method of claim 1, wherein at least one set of related numerical masking data components comprises a number and a set of one or more associated values of Fourier basis functions evaluated on the number.

20. The method of claim 1, wherein the computations further comprise:
determining secret shares of a Fourier series evaluation on the set of input data or the another instance of computed secret shared data by at least:
masking secret shares of the set of input data or the another instance of computed secret shared data with the secret shares of numerical masking data components;
determining and revealing a value represented by the masked secret shares;
calculating values of Fourier series basis functions based on the determined value represented by the masked secret shares; and
calculating the secret shares of the Fourier series evaluation based on the calculated values of the Fourier series basis functions and the secret shares of numerical masking data components.

21. The method of claim 20, wherein the calculating the secret shares of the Fourier series evaluation is performed on the basis of the formula:

$$[\![ e^{imx} ]\!]_+ = e^{im(x \oplus \lambda)} \cdot [\![ e^{im(-\lambda)} ]\!]_+$$

where x represents the set of input data or the another instance of computed secret shared data, $\lambda$ represents the masking data, m represents an integer, the notation $[\![ n ]\!]_+$ denotes additive secret shares of a number n, and the notation $\oplus$ denotes addition modulo $2\pi$.

22. The method of claim 20, wherein the computations further comprise:
approximating a value of a continuous function using a Fourier series selected, based on the set of input data or the another instance of computed secret shared data, from a plurality of determined Fourier series, wherein each of the plurality of determined Fourier series is configured to approximate the continuous function on an associated subinterval of a domain of the continuous function.

23. The method of claim 22, further comprising:
partitioning a portion of the domain of the continuous function into a plurality of subintervals; and
for each subinterval of the plurality of subintervals:
determining a Fourier series approximation of the function on the subinterval.

24. The method of claim 22, wherein the multi-party computations further comprise selecting the associated subinterval using at least one of garbled circuits and oblivious selection.

25. The method of claim 1, wherein distributing the determined sum across the retained sets of lowest order digits of the secret shares of the plurality of party computing systems comprises:
dividing the determined sum by a count of the plurality of party computing systems; and
each party computing system of the plurality of party computing systems adding the divided determined sum to the retained set of lowest order digits of the secret share to calculate a respective secret share of the transformed instance of computed secret shared data.

26. A system comprising a plurality of computer systems, wherein the plurality of computer systems perform the method of claim 1.

27. A non-transitory computer-readable medium encoded with computer code that is executed by a plurality of computer systems and causes the plurality of computer systems to perform the method of claim 1.

* * * * *